United States Patent
Taherzadeh Boroujeni et al.

(10) Patent No.: US 11,844,068 B2
(45) Date of Patent: Dec. 12, 2023

(54) TECHNIQUES FOR DYNAMIC INDICATION OF FREQUENCY HOPPING FOR PHYSICAL UPLINK CONTROL CHANNEL AND DEMODULATION REFERENCE SIGNAL BUNDLING OF PHYSICAL UPLINK CONTROL CHANNEL

(71) Applicant: QUALCOMM Incorporated, San Diego, CA (US)

(72) Inventors: Mahmoud Taherzadeh Boroujeni, San Diego, CA (US); Mostafa Khoshnevisan, San Diego, CA (US); Tao Luo, San Diego, CA (US); Iyab Issam Sakhnini, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/444,530

(22) Filed: Aug. 5, 2021

(65) Prior Publication Data
US 2023/0037290 A1 Feb. 9, 2023

(51) Int. Cl.
*H04W 72/12* (2023.01)
*H04W 72/1268* (2023.01)
*H04W 72/23* (2023.01)
*H04L 5/00* (2006.01)
*H04W 72/0446* (2023.01)

(52) U.S. Cl.
CPC ....... *H04W 72/1268* (2013.01); *H04L 5/0012* (2013.01); *H04L 5/0051* (2013.01); *H04W 72/0446* (2013.01); *H04W 72/23* (2023.01)

(58) Field of Classification Search
None
See application file for complete search history.

(56) References Cited

U.S. PATENT DOCUMENTS

| 11,611,387 B2* | 3/2023 | Cirik | H04L 5/0023 |
| 2020/0077432 A1* | 3/2020 | Xiong | H04L 5/0092 |

(Continued)

FOREIGN PATENT DOCUMENTS

| WO | 2020253517 A1 | 12/2020 |
| WO | 2022031919 A1 | 2/2022 |

OTHER PUBLICATIONS

International Search Report and Written Opinion—PCT/US2022/073557—ISA/EPO—dated Oct. 5, 2022.

(Continued)

*Primary Examiner* — Otis L Thompson, Jr.
(74) *Attorney, Agent, or Firm* — Dalei Dong; Harrity & Harrity, LLP

(57) ABSTRACT

Various aspects of the present disclosure generally relate to wireless communication. In some aspects, an apparatus of a user equipment (UE) may receive, from a base station, a physical downlink control channel (PDCCH) indicating a configuration for one or more of demodulation reference signal (DMRS) bundling that is to be used for channel estimation by the base station for a first group of physical uplink control channels (PUCCHs) or frequency hopping for a second group of PUCCHs. The apparatus may transmit, to the base station, one or more PUCCHs based at least in part on the configuration. Numerous other aspects are described.

30 Claims, 10 Drawing Sheets

(56) References Cited

U.S. PATENT DOCUMENTS

| | | | | |
|---|---|---|---|---|
| 2020/0266947 A1* | 8/2020 | Noh | .................... | H04L 27/2615 |
| 2021/0028899 A1* | 1/2021 | Medles | ................ | H04L 5/0094 |
| 2021/0194556 A1 | 6/2021 | Ly et al. | | |
| 2021/0367727 A1* | 11/2021 | Go | ........................ | H04L 5/0048 |
| 2022/0045813 A1* | 2/2022 | Karmoose | ......... | H04W 72/1268 |
| 2022/0353862 A1* | 11/2022 | Cozzo | ................ | H04W 52/221 |
| 2022/0416978 A1* | 12/2022 | Kalbasi | ................ | H04L 5/0051 |
| 2023/0216632 A1* | 7/2023 | Go | ........................ | H04L 5/0094 |
| | | | | 370/329 |

OTHER PUBLICATIONS

Nokia et al., "PUCCH Coverage Enhancements", 3GPP TSG RAN WG1 #105-e, R1-2105904, vol. RAN WG1, No. e-Meeting, May 19-27, 2021, May 11, 2021, XP052006493, Sections 1-3, 8 Pages.

* cited by examiner

TECHNIQUES FOR DYNAMIC INDICATION OF FREQUENCY HOPPING FOR PHYSICAL UPLINK CONTROL CHANNEL AND DEMODULATION REFERENCE SIGNAL BUNDLING OF PHYSICAL UPLINK CONTROL CHANNEL

FIELD OF THE DISCLOSURE

Aspects of the present disclosure generally relate to wireless communication and to techniques and apparatuses for dynamic indication of frequency hopping for physical uplink control channel (PUCCH) and demodulation reference signal (DMRS) bundling of PUCCH.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include receiving, from a base station, a physical downlink control channel (PDCCH) indicating a configuration for one or more of: demodulation reference signal (DMRS) bundling that is to be used for channel estimation by the base station for a first group of physical uplink control channels (PUCCHs), or frequency hopping for a second group of PUCCHs. The method may include transmitting, to the base station, one or more PUCCHs based at least in part on the configuration.

Some aspects described herein relate to a method of wireless communication performed by an apparatus of a base station. The method may include transmitting, to a UE, a PDCCH indicating a configuration for one or more of: DMRS bundling that is to be used for channel estimation by the base station for a first group of PUCCHs, or frequency hopping for a second group of PUCCHs. The method may include receiving, from the UE, one or more PUCCHs based at least in part on the configuration.

Some aspects described herein relate to an apparatus of a UE for wireless communication. The apparatus may include a memory. The apparatus may include one or more processors, coupled to the memory, configured, receive, from a base station, a PDCCH indicating a configuration for one or more of: DMRS bundling that is to be used for channel estimation by the base station for a first group of PUCCHs, or frequency hopping for a second group of PUCCHs transmit, to the base station, one or more PUCCHs based at least in part on the configuration.

Some aspects described herein relate to an apparatus of a base station for wireless communication. The apparatus may include a memory. The apparatus may include one or more processors, coupled to the memory, configured, transmit, to a UE, a PDCCH indicating a configuration for one or more of: DMRS bundling that is to be used for channel estimation by the base station for a first group of PUCCHs, or frequency hopping for a second group of PUCCHs receive, from the UE, one or more PUCCHs based at least in part on the configuration.

Some aspects described herein relate to a non-transitory computer-readable medium that stores a set of instructions for wireless communication by a UE. The set of instructions, when executed by one or more processors of the UE, may cause the UE to receive, from a base station, a PDCCH indicating a configuration for one or more of: DMRS bundling that is to be used for channel estimation by the base station for a first group of PUCCHs, or frequency hopping for a second group of PUCCHs. The set of instructions, when executed by one or more processors of the UE, may cause the UE to transmit, to the base station, one or more PUCCHs based at least in part on the configuration.

Some aspects described herein relate to a non-transitory computer-readable medium that stores a set of instructions for wireless communication by a base station. The set of instructions, when executed by one or more processors of the base station, may cause the base station to transmit, to a UE, a PDCCH indicating a configuration for one or more of: DMRS bundling that is to be used for channel estimation by the base station for a first group of PUCCHs, or frequency hopping for a second group of PUCCHs. The set of instructions, when executed by one or more processors of the base station, may cause the base station to receive, from the UE, one or more PUCCHs based at least in part on the configuration.

Some aspects described herein relate to an apparatus of a UE for wireless communication. The apparatus may include means for receiving, from a base station, a PDCCH indicating a configuration for one or more of: DMRS bundling that is to be used for channel estimation by the base station for a first group of PUCCHs, or frequency hopping for a second group of PUCCHs. The apparatus may include means for transmitting, to the base station, one or more PUCCHs based at least in part on the configuration.

Some aspects described herein relate to an apparatus of a base station for wireless communication. The apparatus may include means for transmitting, to a UE, a PDCCH indicating a configuration for one or more of: DMRS bundling that is to be used for channel estimation by the base station for a first group of PUCCHs, or frequency hopping for a second group of PUCCHs. The apparatus may include means for receiving, from the UE, one or more PUCCHs based at least in part on the configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
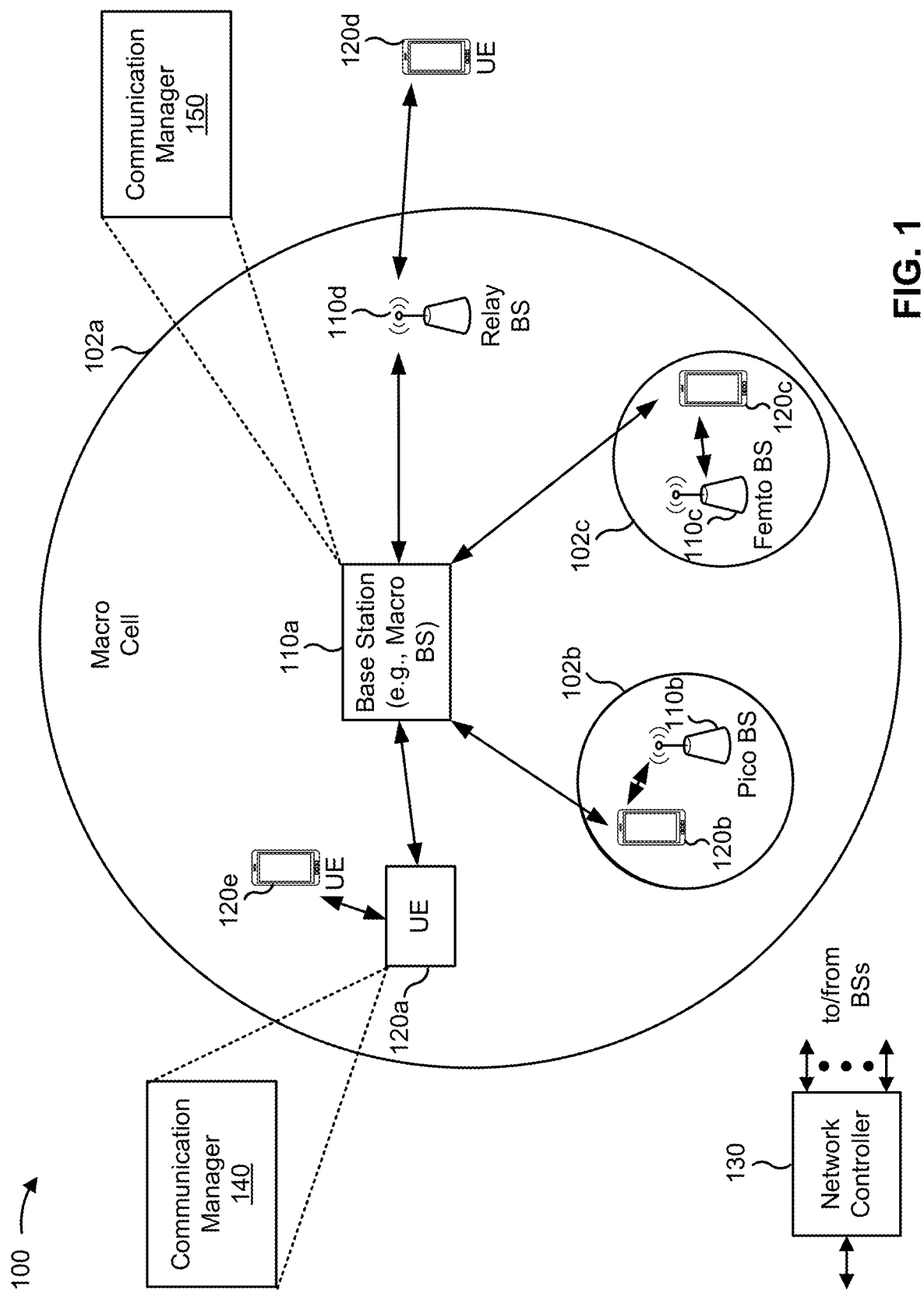
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with dynamic indication of frequency hopping for physical uplink control channel (PUCCH) and demodulation reference signal (DMRS) bundling of PUCCH. Additionally, or alternatively, the communication manager 140 may perform one or more other operations described herein.

In some aspects, the base station 110 may include a communication manager 150. As described in more detail elsewhere herein, the communication manager 150 may perform one or more operations associated with dynamic indication of frequency hopping for PUCCH and DMRS bundling of PUCCH. Additionally, or alternatively, the communication manager 150 may perform one or more other operations described herein.

As indicated above, FIG. 1 is provided as an example. Other examples may differ from what is described with regard to FIG. 1.

Figure 2:
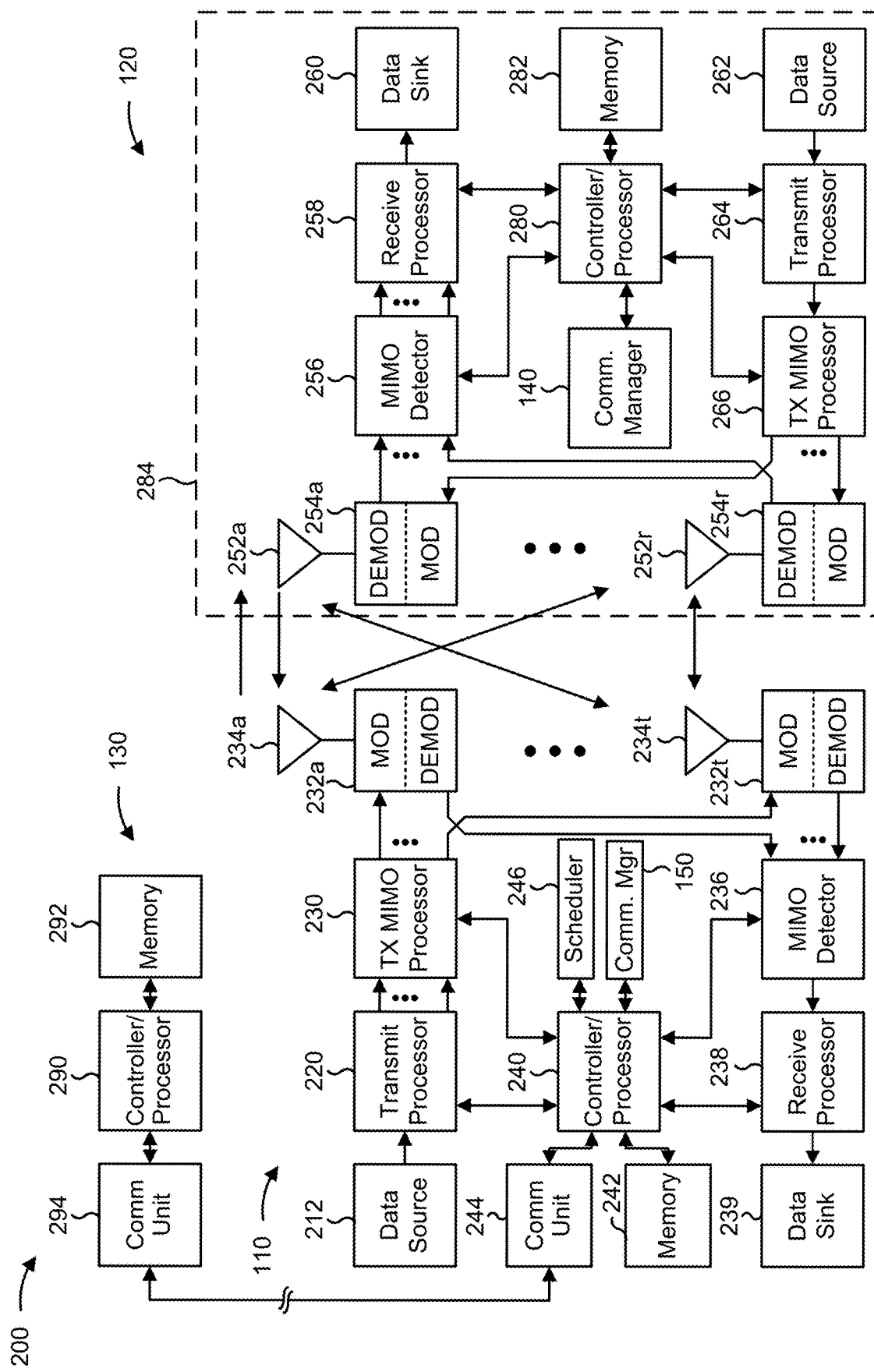
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with dynamic indication of frequency hopping and DMRS bundling for PUCCH repetitions, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, UE 120 may include means for receiving, from a base station, a PDCCH indicating a configuration of one or more of DMRS bundling that is to be used for channel estimation by the base station for a first group of PUCCHs, or frequency hopping for a second group of PUCCHs, means for transmitting, to the base station, one or more PUCCHs based at least in part on the configuration, or the like. In some aspects, such means may include one or more components of UE 120 described in connection with FIG. 2, such as controller/processor 280, transmit processor 264, TX MIMO processor 266, antenna 252, modem 254, MIMO detector 256, receive processor 258, or the like.

In some aspects, base station 110 may include means for transmitting, to a UE, a PDCCH indicating a configuration of one or more of DMRS bundling that is to be used for channel estimation by the base station 110 for a first group of PUCCHs, or frequency hopping for a second group of PUCCHs, means for receiving, from the UE, one or more PUCCHs based at least in part on the configuration, or the like. In some aspects, such means may include one or more components of base station 110 described in connection with FIG. 2, such as antenna 234, MIMO detector 236, receive processor 238, controller/processor 240, transmit processor 220, TX MIMO processor 230, modem 232, antenna 234, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
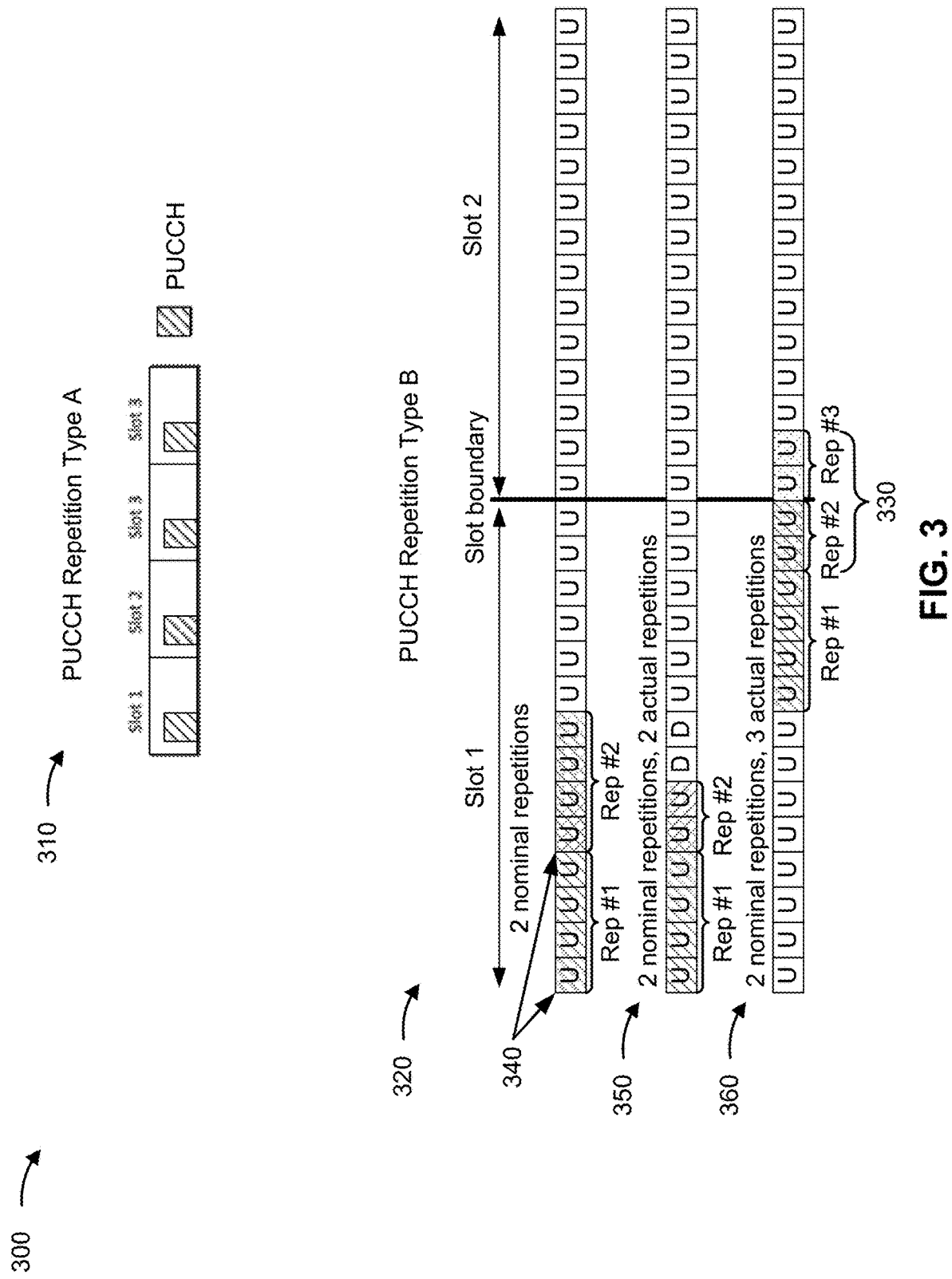
FIG. 3 is a diagram illustrating an example of physical channels and reference signals in a wireless network, in accordance with the present disclosure.

FIG. 3 is a diagram illustrating an example 300 of PUCCH Repetition Type A and PUCCH Repetition Type B, in accordance with the present disclosure. Although techniques are described herein in connection with PUCCH repetitions, these techniques can be applied to various types of uplink repetitions, such as an uplink data repetition, an uplink shared channel repetition (e.g., a physical uplink shared channel (PUSCH) repetition), or the like.

A repetition, such as an uplink repetition or a downlink repetition, may be used to improve reliability, such as for ultra reliable low latency communication (URLLC) or for UEs 120 located in a geographic area with poor channel conditions (e.g., a cell edge). When repetitions are used, a transmitter repeats transmission of a communication multiple times. For example, a UE 120 may transmit an initial uplink communication and may repeat transmission of (e.g., may retransmit) that uplink communication one or more times. When a UE 120 is configured with repetitions, the UE 120 may retransmit an initial transmission without first receiving feedback (e.g., an acknowledgement (ACK) or negative acknowledgement (NACK)) indicating whether the initial transmission was successfully received. In some cases, ACK or NACK feedback may be disabled for repetitions, thereby reducing signaling overhead that would otherwise be used for ACK or NACK feedback.

In some cases, a repeated transmission (sometimes referred to as a retransmission) may include the exact same encoded bits (e.g., information bits and parity bits) as the initial transmission and/or as another repeated transmission (e.g., where a same redundancy version is used across repetitions). Alternatively, a repeated transmission may include different encoded bits (e.g., a different combination of information bits and/or parity bits) than the initial transmission and/or another repeated transmission (e.g., where different redundancy versions are used across repetitions).

As used herein, the term "repetition" is used to refer to the initial communication and is also used to refer to a repeated transmission of the initial communication. For example, if the UE 120 is configured to transmit four repetitions, then the UE 120 may transmit an initial transmission and may transmit three repeated transmissions of that initial transmission. Thus, each transmission (regardless of whether the transmission is an initial transmission or a retransmission) is counted as a repetition. A repetition may be transmitted in a transmission occasion, which is sometimes referred to as a transmission instance.

As shown by reference number 310, for a first uplink repetition type referred to as PUCCH Repetition Type A, uplink transmission occasions are not permitted to cross a slot boundary, and only one uplink transmission occasion is permitted per slot. Thus, if a UE 120 is configured with PUCCH Repetition Type A, then the UE 120 cannot transmit a repetition in a set of symbols that occurs in more than one slot, and the UE 120 can only transmit the repetition if all symbols of the repetition occur in the same slot. Furthermore, if a UE 120 is configured with PUCCH Repetition Type A, then the UE 120 cannot transmit more than one repetition per slot. Thus, for PUCCH Repetition Type A, a transmission occasion corresponds to a slot. Furthermore, for PUCCH Repetition Type A, the time domain allocation for a repetition within a slot may be the same across all slots for which repetitions are scheduled. In other words, each repetition, associated with the same initial transmission, may start in the same starting symbol (e.g., having the same starting symbol index) in each slot in which a repetition is scheduled and may occupy the same number of symbols.

As shown by reference number 320, for a second uplink repetition type referred to as PUCCH Repetition Type B, uplink transmission occasions are permitted to cross a slot boundary (as shown by reference number 330, where a single nominal repetition crosses a slot boundary and is divided into two actual repetitions), and more than one uplink transmission occasion is permitted per slot (as shown by reference number 340). Thus, if a UE 120 is configured with PUCCH Repetition Type B, then the UE 120 can transmit a repetition (e.g., a nominal repetition) in a set of symbols that occurs in more than one slot, and the UE 120 can transmit the repetition even if all symbols of the repetition do not occur in the same slot. Furthermore, if a UE 120 is configured with PUCCH Repetition Type B, then the UE 120 can transmit more than one repetition per slot. Thus, for PUCCH Repetition Type B, a transmission occasion corresponds to a portion of a slot, such as a mini-slot. Furthermore, for PUCCH Repetition Type B, the time domain allocation for a repetition within a slot may be different for different repetitions. In other words, different repetitions, associated with the same initial transmission, may start in different starting symbols (e.g., having different starting symbol indexes).

In PUCCH Repetition Type B, the term "nominal repetition" refers to a potential PUCCH repetition as indicated by the base station 110. A nominal repetition signaled or scheduled by the base station 110 may be truncated or divided into one or two "actual repetitions." A nominal repetition consists of a set of consecutive symbols over which the UE 120 is expected to transmit a PUCCH repetition. However, when this set of consecutive symbols crosses a slot boundary, contains semi-static downlink symbols, or encounters (e.g., is scheduled to occur within) an invalid symbol pattern, among other examples, then the UE 120 is required to split the nominal repetition into one or two parts. Each of these parts is then referred to as an "actual repetition."

For example, as shown by reference number 350, a PUCCH transmission may include four symbols, and a base station 110 may configure a UE 120 (e.g., in a radio resource control (RRC) message) to transmit two nominal repetitions of the PUCCH transmission. The two nominal repetitions may span a total of eight symbols and may each include four symbols. The two nominal repetitions are scheduled in the first eight symbols of a slot (shown as Slot 1). For example, the first nominal repetition may be scheduled in the first four symbols of a slot (the first, second, third, and fourth symbols), and the second nominal repetition may be scheduled in the next four symbols of the slot (the fifth, sixth, seventh, and eighth symbols). The first nominal repetition is actually transmitted in the first four symbols and is thus treated as a single actual repetition (shown as "Rep #1"). For the second nominal repetition, the UE 120 actually transmits the first two symbols but cannot transmit the last two symbols because the last two symbols are downlink symbols. Thus, the UE 120 drops the last two symbols, and the resulting actual repetition (shown as "Rep #2") includes only the first two symbols.

As another example, as shown by reference number 360, a PUCCH transmission may include four symbols, and a base station 110 may configure a UE 120 to transmit two nominal repetitions of the PUCCH transmission. The two nominal repetitions may each include four symbols, shown as the ninth, tenth, eleventh, and twelfth symbols of a first slot (Slot 1) for a first nominal repetition, and shown as the thirteenth and fourteenth symbols of the first slot plus the first and second symbols of a second slot (Slot 2) for a second nominal repetition. The first nominal repetition is transmitted in four consecutive symbols and is thus treated as a single actual repetition (shown as "Rep #1"). The second nominal repetition is transmitted in consecutive symbols that cross a slot boundary (e.g., that occur in more than one slot) and is thus divided into two actual repetitions, with a first actual repetition (shown as "Rep #2") being transmitted in a first set of consecutive symbols in the first slot (the thirteenth and fourteenth symbols of Slot 1) and a second actual repetition (shown as "Rep #3") being transmitted in a second set of consecutive symbols in the second slot (the first and second symbols of Slot 2).

In some cases, a transmitter, such as a UE 120 or a base station 110, may transmit one or more DMRSs to a receiver, such as another UE 120 or base station 110. A DMRS may include a reference signal that is generated from a base sequence, such as a Zadoff-Chu sequence or a Gold sequence. A DMRS may carry information used to estimate a radio channel for demodulation of an associated physical channel. The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. DMRSs are used for both downlink communications and uplink communications. The receiver may perform one or more measurements of the DMRS to estimate a physical channel on which one or more communications are transmitted from the transmitter. In this way, the receiver may determine whether a channel quality of the physical channel satisfies one or more channel quality thresholds and may use the results from the one or more measurements to facilitate demodulation of the communications transmitted on the physical channel.

In some cases, the transmitter and/or receiver may support bundling of DMRSs in the time domain across one or more time slots. That is, when DMRS bundling is configured, the receiver may perform joint or aggregated channel estimation based on DMRS(s) received across multiple slots, as opposed to performing channel estimation separately for each individual slot based on the DMRS(s) received in that slot. DMRS bundling may also be referred to herein as DMRS aggregation. DMRS bundling enables the receiver to perform joint channel estimation on the DMRS in multiple time slots to improve an accuracy of channel estimation.

For DMRS bundling to be supported, the transmitter may be required to maintain a continuity or coherence among the DMRSs transmitted by the transmitter. For example, the transmitter may be required to maintain a phase continuity or a phase coherence among the DMRSs transmitted by the transmitter. "Phase continuity" or "phase coherence" may refer to the transmitter maintaining a radio frequency (RF) phase after modulation among multiple transmissions (e.g., among multiple DMRSs) over time. For example, to maintain phase continuity or phase coherence among DMRSs, the transmitter may maintain a consistency in a phase relationship among multiple DMRSs transmitted in different time slots. Phase continuity or phase coherence among the DMRSs transmitted by the transmitter may be required for DMRS bundling to allow the receiver to aggregate or bundle the DMRSs to perform joint channel estimation based on DMRS(s) received across multiple slots. A failure to maintain phase continuity or phase coherence among the DMRSs may result in the receiver being unable to perform a channel estimation or may result in an inaccurate channel estimation when applying DMRS bundling.

In some cases, a UE 120 may be configured to transmit one or more PUCCH repetitions of a PUCCH communication. For example, the UE 120 may be configured to transmit multiple PUCCH repetitions across different time slots. In some aspects, a PUCCH format of a PUCCH communication may indicate a number of repetitions associated with the PUCCH communication (e.g., a repetition factor). A PUCCH repetition may include one or more DMRSs. Therefore, it may be beneficial for a base station 110 to perform DMRS bundling across DMRSs of PUCCH repetitions to improve an accuracy of a channel estimation of the uplink channel. However, the UE 120 may be unaware of which PUCCH repetitions are to be associated with DMRS bundling and/or may be unaware that the base station 110 is to apply DMRS bundling across DMRSs of multiple PUCCH repetitions. Therefore, the UE 120 may not maintain phase continuity or phase coherence across the PUCCH repetitions. Moreover, some UEs 120 may be unable to support or maintain phase continuity or phase coherence across the multiple PUCCH repetitions (e.g., due to a lack of capability of the UE 120 or an RF hardware configuration of the UE 120). As a result, a UE 120 may not maintain phase continuity or phase coherence across the multiple PUCCH repetitions, resulting in the base station 110 being unable to perform a channel estimation, or resulting in an inaccurate channel estimation, by applying DMRS bundling among DMRSs of the multiple PUCCH repetitions. This may result in decreased demodulation performance by the base station 110.

Some techniques and apparatuses described herein enable dynamic indication of DMRS bundling across DMRSs of multiple PUCCH repetitions. A base station 110 may indicate, to one or more UEs 120, that the base station 110 is to apply DMRS bundling across one or more PUCCH repetitions. For example, the base station 110 may transmit, and the UE 120 may receive, a PDCCH indicating that DMRS bundling is to be applied for one or more PUCCHs. The UE 120 may transmit one or more PUCCHs by maintaining a continuity among DMRSs of the one or more PUCCH repetitions. The base station 110 may receive the one or more PUCCHs. The base station 110 may perform a channel estimation of an uplink channel associated with the one or more PUCCHs by applying DMRS bundling among DMRSs of the one or more PUCCHs. As a result, the UE 120 is enabled to identify PUCCHs that are associated with DMRS bundling and may ensure that a continuity among DMRSs of the PUCCHs is maintained by the UE 120. This enables the base station 110 to apply DMRS bundling among the DMRSs of the PUCCHs thereby improving an accuracy of channel estimation by the base station 110.

As indicated above, FIG. 3 is provided as an example. Other examples may differ from what is described with respect to FIG. 3.

Figure 4:
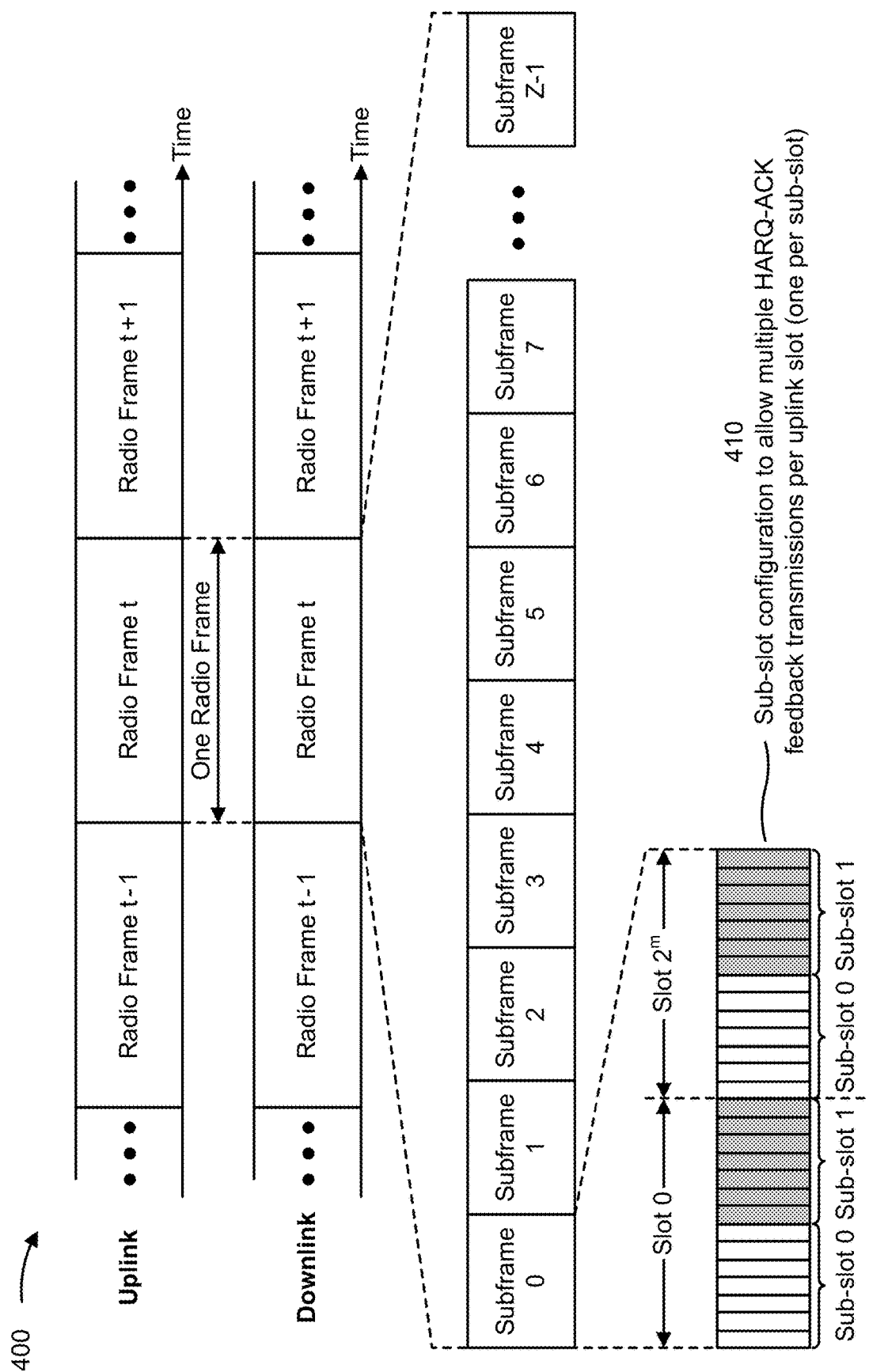
FIG. 4 is a diagram illustrating an example of a frame structure in a wireless communication network, in accordance with the present disclosure.

FIG. 4 is a diagram illustrating an example 400 of a frame structure in a wireless communication network, in accordance with the present disclosure. The frame structure shown in FIG. 4 may be used for frequency division duplexing (FDD) in a telecommunication system, such as LTE, NR, and/or the like. For example, as shown, the FDD configuration may include an uplink frequency in which uplink transmissions may be performed, and the uplink frequency may be paired with a downlink frequency in which downlink transmissions may be performed. However, it will be appreciated that the same or a similar frame structure may be used for time division duplexing (TDD), where uplink and downlink transmissions are performed in the same frequency at separate times.

In some aspects, as shown in FIG. 4, the frame structure includes a transmission timeline that may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 4, where m is an index of a numerology used for a transmission, such as 0, 1, 2, 3, 4, and/or the like). Each slot may include a set of L symbol periods. For example, each slot may include fourteen symbol periods (e.g., as shown in FIG. 4), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit may be frame-based, subframe-based, slot-based, mini-slot based, sub-slot based, symbol-based, and/or the like.

For example, in a wireless network (e.g., wireless network 100 and/or the like), a base station may transmit one or more downlink communications to a UE, such as a physical downlink shared channel (PDSCH), a PDCCH scheduling the PDSCH, and/or the like. The UE may attempt to decode the downlink communication(s) and transmit, to the base station, a PUCCH that includes hybrid automatic repeat request (HARQ) ACK (HARQ-ACK) feedback to indicate whether the PDSCH scheduled by the PDCCH was successfully received and/or decoded. For example, in cases where the UE receives and is able to decode the PDSCH, the HARQ-ACK feedback may include an ACK to indicate that the PDSCH was received and successfully decoded.

Alternatively, in cases where the UE does not receive the PDSCH or is unable to successfully decode the PDSCH, the HARQ-ACK feedback may include a NACK to indicate that the PDSCH was not received and/or unsuccessfully decoded, which may trigger a retransmission of the PDSCH by the base station. However, some wireless networks are associated with a restriction that limits a UE to one HARQ-ACK feedback transmission per uplink slot. This may increase latency associated with HARQ-ACK feedback because a UE has to wait until a next uplink slot to transmit another PUCCH that includes HARQ-ACK feedback, which may result in unacceptable performance for delay-sensitive services (e.g., a URLLC service that requires a latency of 1 ms or less).

Accordingly, as shown in FIG. 4, and by reference number 410, a frame structure may be associated with a sub-slot configuration that allows more than one HARQ-ACK feedback transmission by a UE in a single uplink slot. For example, FIG. 4 illustrates a seven (7) OFDM symbol sub-slot configuration that can allow up to two (2) HARQ-ACK feedback transmissions per slot. In another example, a two (2) OFDM symbol sub-slot configuration can allow up to seven (7) HARQ-ACK feedback transmissions per slot. In general, the sub-slot configuration applies only to HARQ-ACK feedback, and does not apply to PDCCH, PDSCH, and/or PUSCH transmissions or to K0 or K2 parameters that relate to scheduling offsets between scheduling downlink control information (DCI) and dynamically scheduled PDSCH or PUSCH transmissions. In other words, the sub-slot configuration may be used to partition a slot into multiple sub-slots such that a UE can transmit one PUCCH that includes HARQ-ACK feedback per sub-slot. For example, a base station may transmit information related to a sub-slot configuration to a UE, and the base station may indicate a value for a K1 parameter that applies to HARQ-ACK feedback to be carried in a PUCCH. In particular, the K1 parameter may indicate a scheduling offset from PDSCH reception to HARQ-ACK feedback transmission and may generally have a sub-slot granularity if a sub-slot configuration is enabled or a slot granularity if a sub-slot configuration is not enabled (e.g., if the base station configures the K1 parameter to have a value of two (2), the UE may be configured to transmit HARQ-ACK feedback two (2) sub-slots after PDSCH reception if a sub-slot configuration is enabled, or two (2) slots after PDSCH reception if a sub-slot configuration is not enabled). In this way, the sub-slot configuration may enable faster HARQ-ACK feedback, which may reduce the latency associated with retransmissions that may be needed for downlink transmissions that were not received and/or were unsuccessfully decoded by the UE.

A PUCCH may carry uplink control information (UCI), such as HARQ acknowledgments, scheduling requests, and channel state information (CSI) reports. A PUCCH may be transmitted on a PUCCH resource. A UE may identify a PUCCH resource using a combination of a PUCCH resource indicator (PRI) and an allocated control channel element (CCE). The PRI is a three-bit field from within the PDCCH DCI used to allocate a corresponding PDSCH. The combination of the three-bit PRI and a bit extracted from the allocated CCE of the PDCCH (based on whether the CCE has an even index or an odd index) is used to identify one out of 16 UE-specific PUCCH resources.

One or more PUCCH resources may be configured as part of a PUCCH resource set. A PUCCH resource set may be selected based at least in part on a size of the PUCCH to be transmitted. A PUCCH resource can be configured with a PUCCH repetition factor. Thus, the PUCCH repetition factor can be indicated by scheduling a PDSCH using a PDCCH that indicates a PUCCH resource configured with the desired PUCCH repetition factor. In this way, the combination of the three-bit PRI and the one bit indicated by the allocated CCE of the PDCCH can dynamically indicate a PUCCH repetition factor. However, the maximum number of PUCCH resources and PUCCH resource sets may limit the number of PUCCH repetition factors that can be indicated in this fashion. For example, if up to four PUCCH resource sets can be configured, and up to sixteen PUCCH resources can be configured, then there may be a limitation on how many different PUCCH repetition factors can be configured for each PUCCH resource set. The techniques described herein enable indication of a PUCCH frequency hopping factor for a PUCCH using one or more parameters associated with a PDCCH scheduling a PDSCH, or one or more factors associated with the PDSCH itself, which increases the number of usable PUCCH frequency hopping factors without modifying DCI format or PRI bitfield length.

As indicated above, FIG. 4 is provided as an example. Other examples may differ from what is described with respect to FIG. 4.

Figure 5:
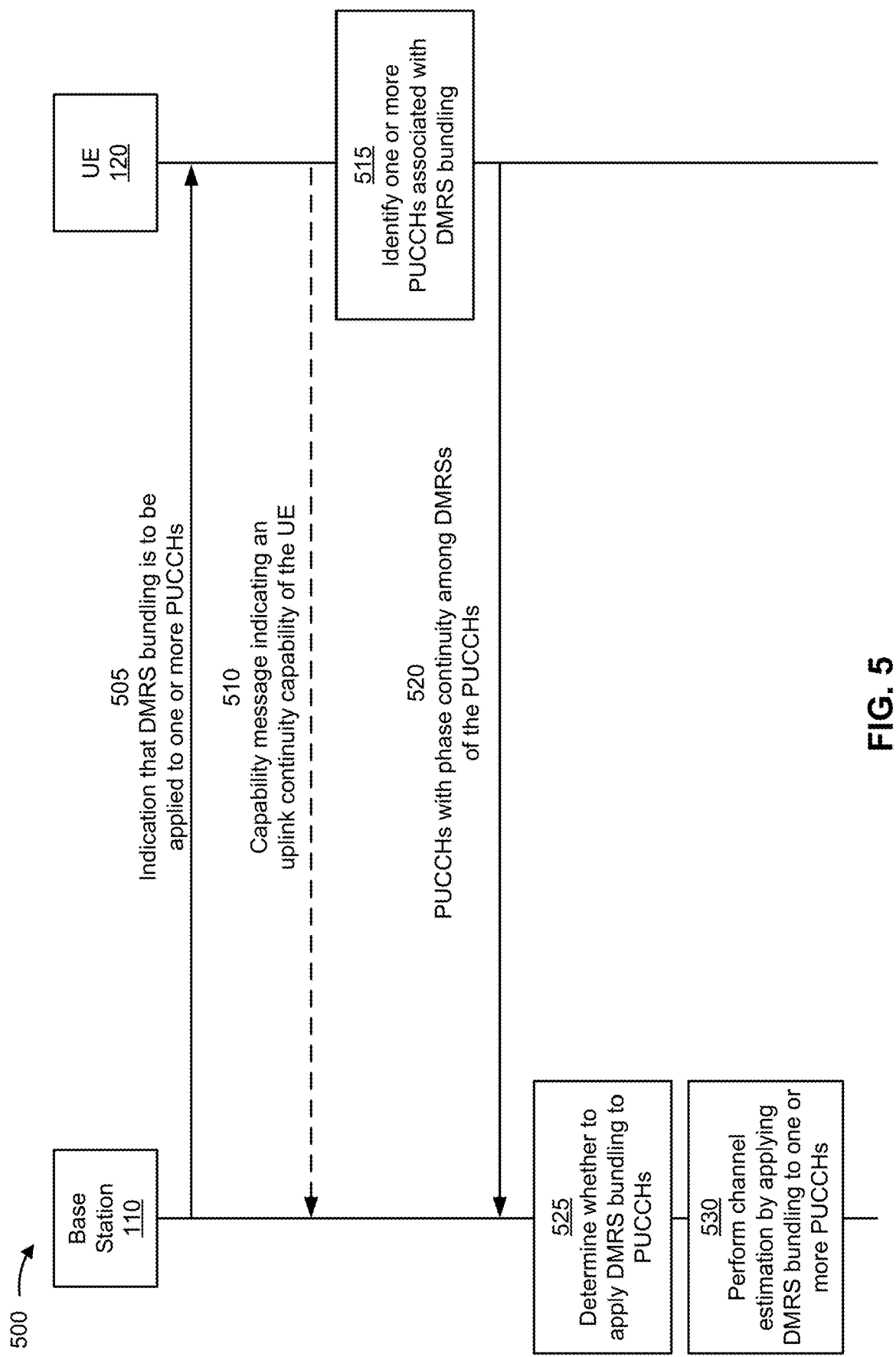
FIG. 5 is a diagram illustrating an example associated with dynamic indication of frequency hopping for physical uplink control channel (PUCCH) repetitions, in accordance with the present disclosure.

FIG. 5 is a diagram illustrating an example 500 associated with DMRS bundling for a group of PUCCHs (e.g., PUCCH repetitions), in accordance with the present disclosure. As shown in FIG. 5, a base station 110 and a UE 120 may communicate with one another. In some aspects, the base station 110 and the UE 120 may be included in a wireless network, such as wireless network 100. The base station 110 and the UE 120 may communicate via a wireless access link, which may include an uplink and a downlink.

As shown by reference number 505, the base station 110 may transmit, and the UE 120 may receive, an indication that DMRS bundling is to be used for channel estimation by the base station 110 for a group of PUCCHs. For example, the base station 110 may transmit, and the UE 120 may receive, a physical downlink control channel (PDCCH) indicating a configuration for DMRS bundling that is to be used for channel estimation by the base station 110 for a group of PUCCHs. In some aspects, the indication that DMRS bundling is to be used for channel estimation by the base station 110 for PUCCH repetitions may be an indication to the UE 120 to apply uplink continuity among DMRSs of a group of PUCCHs (e.g., to enable the base station 110 to apply DMRS bundling among the DMRSs of the group of PUCCHs). In some aspects, the UE 120 may apply uplink continuity among DMRSs of a group of PUCCHs by maintaining a phase continuity among the DMRSs, by maintaining an amplitude continuity among the DMRSs, by avoiding any change in uplink spatial filtering among the DMRSs, by avoiding any change in an uplink precoding associated with the group of PUCCHs, and/or by avoiding any change in a time advance associated with transmitting the group of PUCCHs, among other examples.

In some aspects, the indication that DMRS bundling is to be used for channel estimation by the base station 110 for the group of PUCCHs may be included in a semi-static configuration transmitted by the base station 110. For example, the indication may indicate that DMRS bundling is to be used for channel estimation by the base station 110 until overridden by another configuration, for a preconfigured time period, and/or until expiration of a time period, among other examples.

In some aspects, the indication that DMRS bundling is to be used for channel estimation by the base station 110 for the group of PUCCHs may be included in a dynamic indication transmitted by the base station 110. In some aspects, the indication that DMRS bundling is to be used for channel estimation by the base station 110 for the group of PUCCHs may be based at least in part on a format of a PUCCH included in the group of PUCCHs, a frequency band of the PUCCH, a frequency range of the PUCCH, and/or a subcarrier spacing (SCS) of the PUCCH, among other examples.

In some aspects, the dynamic indication that DMRS bundling is to be used for channel estimation by the base station 110 for the group of PUCCHs may be included in a PDCCH received by the UE 120. In some aspects, the PDCCH includes DCI for scheduling resources for a PDSCH, and content included in the DCI may indicate that DMRS bundling is to be used for channel estimation by the base station 110 for the group of PUCCHs.

In some aspects, a PRI bitfield of the DCI may indicate that the DMRS bundling is to be used for the channel estimation by the base station for the group of PUCCHs. The PRI bitfield may indicate a PUCCH resource associated with the group of PUCCHs. In some aspects, DMRS bundling may be preconfigured for the PUCCH resource. The UE 120 may determine that DMRS bundling is to be used for channel estimation by the base station 110 for the group of PUCCHs based at least in part on DMRS bundling being preconfigured for the PUCCH resource.

In some aspects, DMRS bundling may be configured per PUCCH resource. For example, the UE 120 may be allocated multiple PUCCH resources and DMRS bundling may be preconfigured on a PUCCH basis. In some aspects, a PUCCH resource may be associated with a plurality of options (e.g., a first option associated with DMRS bundling, a second option associated with frequency hopping, a third option associated with DMRS bundling and frequency hopping, and/or a fourth option indicating that neither DMRS bundling nor frequency hopping is to be applied). The PDCCH may indicate an option, of the plurality of options associated with a PUCCH resource, and the UE 120 may determine that DMRS bundling is to be used for channel estimation by the base station 110 for the group of PUCCHs based at least in part on the indicated option for the PUCCH resource.

In some aspects, the PDCCH is configured to indicate a first option or a second option. The PDCCH may indicate the first option when only DMRS bundling is to be used for channel estimation by the base station 110. The PDCCH may indicate the second option when only frequency hopping is to be applied to transmitting the group of PUCCHs. In some aspects, the PDCCH may indicate the second option and a zero frequency offset when DMRS bundling is not to be used for channel estimation by the base station 110 and when frequency hopping is not to be applied when transmitting the group of PUCCHs.

In some aspects, the PUCCH resource may be indicated based at least in part on a cell radio network temporary identifier (C-RNTI) that is used to mask a cyclic redundancy check (CRC) of the PDCCH. In some aspects, the C-RNTI may be shifted by a fixed number to indicate an alternative subset of PUCCH resources. The UE 120 may determine that DMRS bundling is to be used for channel estimation by the base station 110 for the group of PUCCHs based at least in part on DMRS bundling being preconfigured for the alternative set of PUCCH resources.

In some aspects, a time domain resource assignment (TDRA) bitfield of the DCI indicates that DMRS bundling is to be used for channel estimation by the base station 110 for the group of PUCCHs. For example, a column of a TDRA table maintained by the UE 120 may map a value of the TDRA bitfield to information indicating that DMRS bundling is to be used for channel estimation by the base station 110 for the group of PUCCHs.

In some aspects, a frequency domain resource assignment (FDRA) bitfield of the DCI indicates that DMRS bundling is to be used for channel estimation by the base station 110 for the group of PUCCHs. In some aspects, the FDRA bitfield may indicate that DMRS bundling is to be used for channel estimation by the base station 110 for the group of PUCCHs based at least in part on a value of a first resource block (RB) index.

For example, the FDRA bitfield may indicate that DMRS bundling is to be used for channel estimation by the base station 110 for the group of PUCCHs based at least in part on the value of the FDRA bitfield comprising an even value (or an odd value).

In some aspects, one or more parameters of the PDCCH may indicate that DMRS bundling is to be used for channel estimation by the base station 110 for the group of PUCCHs. For example, an index of a first control channel element (CCE) of the PDCCH, an aggregation level of the PDCCH, a C-RNTI that is used to mask a CRC of the PDCCH, a PDCCH DMRS sequence, and/or a port of the UE 120 (e.g., a port at which the PDCCH is received by the UE 120 or a port from which a PUCCH including a DMRS is transmitted), among other examples, may indicate that DMRS bundling is to be used for channel estimation by the base station 110 for the group of PUCCHs. In some aspects, one or more parameters of the PDCCH in combination with the content of the DCI may indicate that DMRS bundling is to be used for channel estimation by the base station 110 for the group of PUCCHs. As an example, the index of the first CCE in combination with the PRI bitfield of the DCI may indicate that DMRS bundling is to be used for channel estimation by the base station 110 for the group of PUCCHs.

In some aspects, the base station 110 may transmit the indication that DMRS bundling is to be used for channel estimation by the base station 110 for the group of PUCCHs to one or more UEs 120. For example, the indication may be a group-common indication that is transmitted to multiple UEs 120. In some aspects, the indication that DMRS bundling is to be used for channel estimation by the base station 110 for the group of PUCCHs may be a UE-specific indication (e.g., the indication may be transmitted to a single UE 120).

In some aspects, the base station 110 may transmit the indication that DMRS bundling is to be used for channel estimation by the base station 110 for the group of PUCCHs in a DCI message. In some aspects, the base station 110 may transmit the indication that DMRS bundling is to be used for channel estimation by the base station 110 for the group of PUCCHs in a medium access control (MAC) control element (MAC-CE) message.

In some aspects, the base station 110 may transmit, to the UE 120, an indication of a PUCCH repetition factor. The PUCCH repetition factor may indicate a number of repetitions associated with the PUCCH communication. The indication of the PUCCH repetition factor may be a dynamic indication transmitted by the base station 110. In some aspects, the base station 110 may transmit the indication of the PUCCH repetition factor and the indication that DMRS bundling is to be used for channel estimation by the base station 110 for the group of PUCCHs in the same message (e.g., as part of the same dynamic indication).

As shown by reference number 510, in some aspects, the UE 120 may transmit, and the base station 110 may receive, a capability message that indicates an uplink continuity capability of the UE 120. In some aspects, the uplink continuity capability may indicate whether the UE 120 can support phase continuity across DMRSs of multiple PUCCH repetitions. In some aspects, the phase continuity capability may indicate an amount of time that the UE 120 can maintain phase continuity across multiple transmissions. In some aspects, the phase continuity capability may indicate one or more antennas of the UE 120 across which phase continuity can be maintained (e.g., the UE 120 may be capable of maintaining phase continuity among transmissions using a first antenna and a third antenna, but may not be capable of maintaining phase continuity among transmissions using the first antenna and a second antenna).

In some aspects, the uplink continuity capability may indicate whether the UE 120 is capable of maintaining phase continuity among non-consecutive transmissions that use the same transmit beam. For example, the UE 120 may communicate using a beam A and a beam B. The uplink continuity capability may indicate whether the UE 120 is capable of maintaining phase continuity among transmissions on beam A if the UE 120 is to transmit a communication on beam B between the transmissions on beam A. That is, if transmissions by the UE 120 have an order in the time domain of a first transmission on beam A, a second transmission on beam B, and a third transmission on beam A, then the phase continuity capability may indicate whether the UE 120 is capable of maintaining phase continuity among the first transmission and the third transmission.

In some aspects, the base station 110 may determine whether to apply DMRS bundling to the group of PUCCHs transmitted by a UE 120 based at least in part on a reported uplink continuity capability of the UE 120. For example, in some aspects, the base station 110 may transmit a group-common indication, to a set of UEs 120, that DMRS bundling is to be used for channel estimation by the base station 110 for the group of PUCCHs. The base station 110 may receive, from one or more (or all) of the set of UEs 120, an uplink continuity capability message. The base station 110 may identify a subset of UEs 120, from the set of UEs 120, that have indicated a sufficient phase continuity capability for DMRS bundling. The base station 110 may perform channel estimation by applying DMRS bundling among DMRSs of the group of PUCCHs received from the subset of UEs 120, as described below in more detail.

As shown by reference number 515, the UE 120 may identify one or more PUCCHs that are associated with DMRS bundling. For example, the UE 120 may identify one or more PUCCH repetitions for which the UE 120 is to maintain uplink continuity for DMRSs of the PUCCH repetitions (e.g., to enable the base station 110 to apply DMRS bundling among the DMRSs of the one or more PUCCH repetitions) based at least in part on the indication of a configuration in the PDCCH, as described elsewhere herein.

As shown by reference number 520, the UE 120 may transmit, to the base station 110, one or more PUCCHs (e.g., the group of PUCCHs) by maintaining an uplink continuity among DMRSs of the one or more PUCCHs. For example, the UE 120 may determine whether the uplink continuity capability of the UE 120 is sufficient for maintaining an uplink continuity among DMRSs of the one or more PUCCHs. The UE 120 may identify one or more PUCCHs for which an uplink continuity among DMRSs of the one or more PUCCHs is to be maintained (e.g., based at least in part on identifying a PUCCH repetition group).

As shown by reference number 525, the base station 110 may determine whether to apply DMRS bundling to PUCCHs received from the UE 120. For example, the base station 110 may determine whether to apply DMRS bundling to the one or more PUCCHs received from the UE 120 based at least in part on the uplink continuity capability of the UE 120. In some aspects, the base station 110 may determine to apply DMRS bundling to the one or more PUCCHs received from the UE 120 when the uplink continuity capability of the UE 120 indicates that the UE 120 is able to maintain an uplink continuity among the DMRSs of the one or more PUCCHs.

As shown by reference number 530, the base station 110 may perform a channel estimation of an uplink channel associated with the one or more PUCCHs by applying DMRS bundling among DMRSs of the one or more PUCCHs. For example, the base station 110 may perform a joint channel estimation using the DMRSs of the one or more PUCCHs that are transmitted across multiple time slots.

As a result, the UE 120 is enabled to identify PUCCHs that are associated with DMRS bundling and may ensure that an uplink continuity among DMRSs of the PUCCHs is maintained by the UE 120. This enables the base station 110 to apply DMRS bundling among the DMRSs of the PUCCHs thereby improving an accuracy of channel estimation by the base station 110.

As indicated above, FIG. 5 is provided as an example. Other examples may differ from what is described with respect to FIG. 5.

Figure 6:
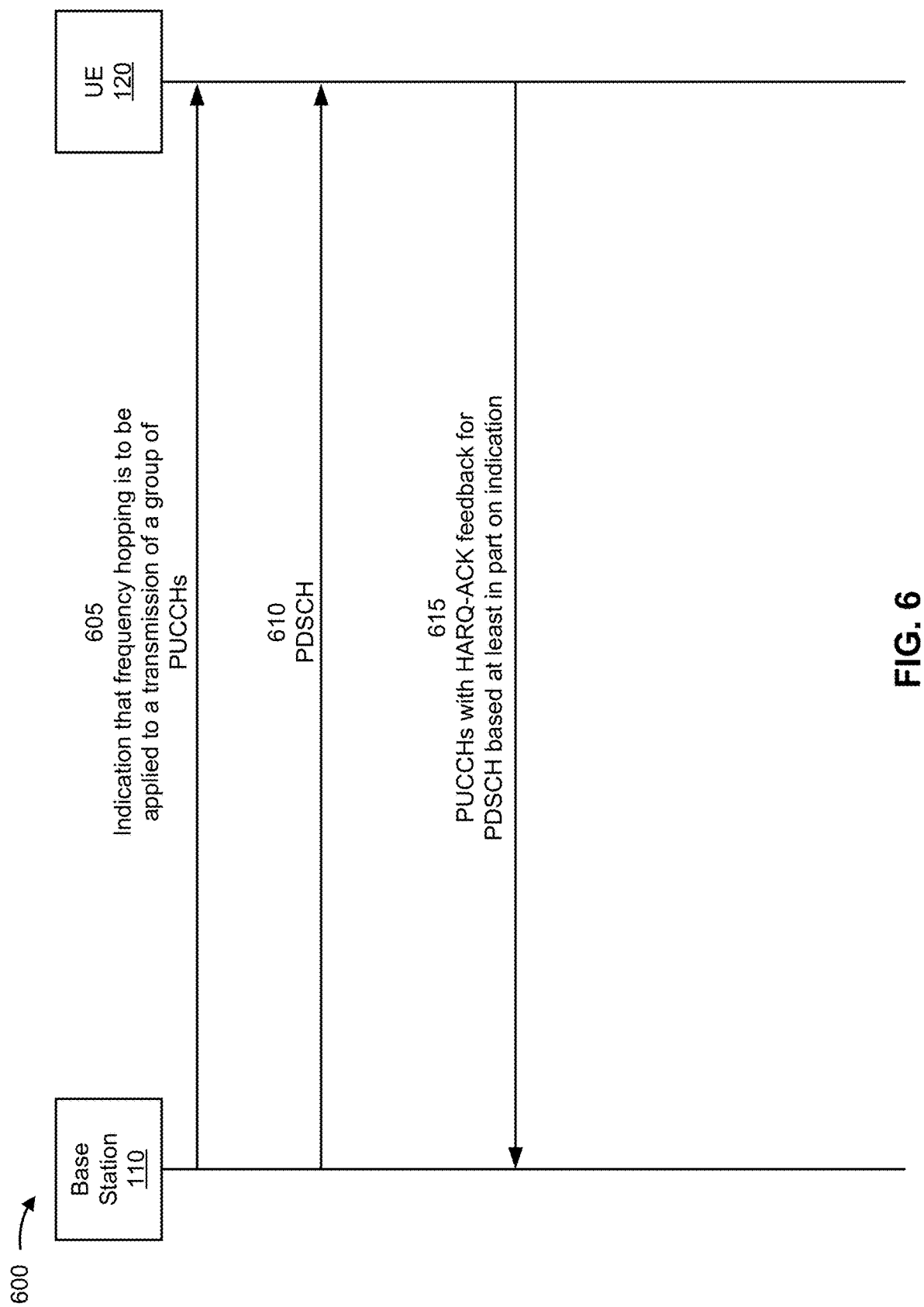
FIG. 6 is a diagram illustrating an example associated with dynamic indication of demodulation reference signal (DMRS) bundling for PUCCH repetitions, in accordance with the present disclosure.

FIG. 6 is diagram illustrating an example 600 of dynamic indication of frequency hopping for a PUCCH, in accordance with the present disclosure. As shown in FIG. 6, a base station 110 and a UE 120 may communicate with one another. In some aspects, the base station 110 and the UE 120 may be included in a wireless network, such as wireless network 100. The base station 110 and the UE 120 may communicate via a wireless access link, which may include an uplink and a downlink.

As shown by reference number 605, the base station 110 may transmit, and the UE 120 may receive, an indication that frequency hopping is to be applied to a transmission of a group of PUCCHs. In some aspects, the indication that frequency hopping is to be applied to a transmission of the group of PUCCHs may be transmitted with an indication that DMRS bundling is to be applied to a group of PUCCHs, as described elsewhere herein. The group of PUCCHs to which DMRS bundling is to be applied may be the same as, or different from, the group of PUCCHs to which frequency hopping is applied.

In some aspects, the indication that frequency hopping is to be applied to a transmission of the group of PUCCHs may be included in a semi-static configuration transmitted by the base station 110. For example, the indication may indicate that frequency hopping is to be applied until overridden by another configuration, for a preconfigured time period, and/or until expiration of a time period, among other examples.

In some aspects, the indication that frequency hopping is to be applied to a transmission of the group of PUCCHs may be based at least in part on a format of a PUCCH included in the group of PUCCHs, a frequency band of the PUCCH, a frequency range of the PUCCH, and/or an SCS of the PUCCH, among other examples.

In some aspects, the dynamic indication that frequency hopping is to be applied to a transmission of the group of PUCCHs may be included in a PDCCH received by the UE 120. In some aspects, the PDCCH includes DCI for scheduling resources for a PDSCH, and content included in the DCI may indicate that frequency hopping is to be applied to a transmission of the group of PUCCHs.

In some aspects, a PRI bitfield of the DCI may indicate that frequency hopping is to be applied to a transmission of the group of PUCCHs. The PRI bitfield may indicate a PUCCH resource associated with the group of PUCCHs. The PUCCH resource may be associated with a PUCCH resource configuration that indicates that frequency hopping is to be applied to a transmission of the PUCCH. For example, the PUCCH resource configuration may indicate a starting RB, a second hop RB, a frequency offset associated with frequency hopping.

In some aspects, frequency hopping may be preconfigured for the PUCCH resource. The UE 120 may determine that frequency hopping is to be applied to a transmission of the group of PUCCHs based at least in part on frequency hopping being preconfigured for the PUCCH resource.

In some aspects, frequency hopping may be configured per PUCCH resource. For example, the UE 120 may be allocated multiple PUCCH resources and frequency hopping may be preconfigured on a per PUCCH resource (or a group of PUCCH resources) basis. In some aspects, a PUCCH resource may be associated with a plurality of options (e.g., a first option associated with DMRS bundling, a second option associated with frequency hopping, a third option associated with DMRS bundling and frequency hopping, and/or a fourth option indicating that neither DMRS bundling or frequency hopping is to be applied). The PDCCH may indicate an option, of the plurality of options associated with a PUCCH resource, and the UE 120 may determine that frequency hopping is to be applied to a transmission of the group of PUCCHs based at least in part on the indicated option for the PUCCH resource.

In some aspects, the PDCCH is configured to indicate a first option or a second option. The PDCCH may indicate the first option when only DMRS bundling is to be used for channel estimation by the base station 110. The PDCCH may indicate the second option when only frequency hopping is to be applied to transmitting the group of PUCCHs. In some aspects, the PDCCH may indicate the second option and a zero frequency offset when DMRS bundling is not to be used for channel estimation by the base station 110 and when frequency hopping is not to be applied when transmitting the group of PUCCHs.

In some aspects, the PUCCH resource may be indicated based at least in part on a C-RNTI that is used to mask a CRC of the PDCCH. In some aspects, the C-RNTI may be shifted by a fixed number to indicate an alternative subset of PUCCH resources. The UE 120 may determine that frequency hopping is to be applied to a transmission of the group of PUCCHs based at least in part on frequency hopping being preconfigured for the alternative set of PUCCH resources.

In some aspects, a TDRA bitfield of the DCI indicates that DMRS bundling is to be used for channel estimation by the base station 110 for the group of PUCCHs. For example, a column of a TDRA table maintained by the UE 120 may map a value of the TDRA bitfield to information indicating that frequency hopping is to be applied to a transmission of the group of PUCCHs.

In some aspects, a size and length indicator value (SLIV) or a function of the SLIV indicates that frequency hopping is to be applied to a transmission of the group of PUCCHs. For example, frequency hopping may be indicated based at least in part on whether the SLIV is an odd value or an even value.

In some aspects, an FDRA bitfield of the DCI indicates that frequency hopping is to be applied to a transmission of the group of PUCCHs. In some aspects, the FDRA bitfield may indicate that frequency hopping is to be applied to a transmission of the group of PUCCHs based at least in part on a value of a first RB index. For example, the FDRA bitfield may indicate that frequency hopping is to be applied to a transmission of the group of PUCCHs based at least in part on the value of the FDRA bitfield comprising an even value (or an odd value).

In some aspects, one or more parameters of the PDCCH may indicate that frequency hopping is to be applied to a transmission of the group of PUCCHs. For example, frequency hopping may be indicated based at least in part on one or more parameters of the PDCCH and the PRI, one or more parameters of the PDCCH and content of the DCI that is different from the PRI, one or more parameters of the PDCCH, the PRI, and the content of the DCI that is different from the PRI, content of the DCI that is different from the PRI, or the PRI and the content of the DCI that is different from the PRI.

As an example, an index of a first CCE of the PDCCH, an aggregation level of the PDCCH, a C-RNTI that is used to mask a CRC of the PDCCH, a PDCCH DMRS sequence, a number of repetitions indicated for the PDSCH, a transmit power control (TPC) command, an orthogonal cover code, a virtual cell identifier, and/or a port of the UE 120 (e.g., a port at which the PDCCH is received by the UE 120 or a port from which a PUCCH including a DMRS is transmitted), among other examples, may indicate that frequency hopping is to be applied to a transmission of the group of PUCCHs. In some aspects, one or more parameters of the PDCCH in combination with the content of the DCI may indicate that frequency hopping is to be applied to a transmission of the group of PUCCHs. As an example, the combination of the aggregation level of the PDCCH, the index of the first CCE, and the PRI bitfield of the DCI may indicate that frequency hopping is to be applied to a transmission of the group of PUCCHs.

In some aspects, the base station 110 may transmit the indication that frequency hopping is to be applied to a transmission of the group of PUCCHs to one or more UEs 120. For example, the indication may be a group-common indication that is transmitted to multiple UEs 120. In some aspects, the indication that frequency hopping is to be applied to a transmission of the group of PUCCHs may be a UE-specific indication (e.g., the indication may be transmitted to a single UE 120).

In some aspects, the base station 110 may transmit the indication that DMRS bundling is to be used for channel estimation by the base station 110 for the group of PUCCHs in a DCI message. In some aspects, the base station 110 may transmit the indication that DMRS bundling is to be used for channel estimation by the base station 110 for the group of PUCCHs in a MAC-CE message.

In some aspects, prior to transmitting the indication to the UE 120, the base station 110 may transmit, and the UE 120 may receive, RRC signaling to configure a set of multiple PUCCH repetition factors. Accordingly, in some aspects, the DCI that dynamically schedules the one or more PDSCH transmissions may include one or more bits to dynamically indicate the PUCCH repetition factor among the set of multiple PUCCH repetition factors. For example, the set of multiple PUCCH repetition factors may generally include up to 2× members, and the DCI may include Xbits to indicate one of the 2×PUCCH repetition factors that the UE is to use when transmitting a PUCCH that includes HARQ-ACK feedback for the PDSCH transmission(s) scheduled by the DCI. As an example, the set of PUCCH repetition factors configured by the RRC signaling may include four (or 22) members (e.g., {1, 2, 4, 8}), in which case the DCI may include two bits to uniquely indicate one of the members in the set of PUCCH repetition factors.

In some aspects, prior to the base station 110 transmitting the indication to the UE 120, the base station 110 may transmit, and the UE 120 may receive, RRC signaling to configure a set of multiple PUCCH frequency hopping factors. Accordingly, in some aspects, the DCI that dynamically schedules the one or more PDSCH transmissions may include one or more bits to dynamically indicate, among the set of multiple PUCCH repetition factors, a PUCCH frequency hopping factor that the UE 120 is to use when transmitting the PUCCH that includes the HARQ-ACK feedback for the PDSCH transmission(s) scheduled by the DCI. For example, the set of PUCCH frequency hopping factors may generally include up to $2^Y$ members, and the DCI may include Y bits to indicate one of the $2^Y$ PUCCH repetition factors that the UE is to use when transmitting a PUCCH that includes HARQ-ACK feedback for the PDSCH transmission(s) scheduled by the DCI. For example, the DCI may include two bits to uniquely indicate one of the members in a set of PUCCH frequency hopping factors having four members, three bits to uniquely indicate one of the members in a set of PUCCH frequency hopping factors having eight members, and/or the like.

In general, a PUCCH frequency hopping factor of one (1) may indicate no frequency hopping for the PUCCH transmission, and a PUCCH repetition factor of M may indicate that the UE 120 is to transmit a PUCCH and N−1 repetitions of the PUCCH over M frequencies. In other words, the PUCCH frequency hopping factor may indicate a total number of frequencies that the UE 120 is to use to transmit the PUCCH that includes the HARQ-ACK feedback for the PDSCH transmission(s) scheduled by the DCI. Accordingly, the DCI may indicate a PUCCH frequency hopping factor that has a value greater than one (1) to enable the UE 120 to transmit a PUCCH and one or more repetitions of the PUCCH using different frequencies over multiple uplink slots or uplink sub-slots. In some aspects, a step size between the different frequencies may be preconfigured (e.g., fixed, defined in a wireless communication standard, and/or the like), configured by RRC signaling, and/or configured by the DCI that indicates the PUCCH frequency hopping factor. In this way, when frequency hopping is enabled (e.g., with a PUCCH frequency hopping factor greater than 1), the UE 120 may determine the particular frequencies in which to transmit the PUCCH and/or the one or more repetitions of the PUCCH based at least in part on a frequency resource that is configured for the initial PUCCH transmission and the configured step size. In this way, when the UE 120 is configured to transmit multiple instances of the PUCCH that includes the HARQ-ACK feedback for the PDSCH transmission(s) scheduled by the DCI (e.g., an initial PUCCH transmission and one or more repetitions of the PUCCH transmission), the PUCCH frequency hopping factor indicated in the DCI can be used to configure the UE 120 to transmit the multiple instances of the PUCCH in different frequencies to increase frequency diversity and/or robustness for the PUCCH transmission(s).

As shown by reference number 610, the base station 110 may transmit, to the UE, one or more PDSCH transmissions scheduled by the DCI. Accordingly, in some aspects, the UE 120 may generate HARQ-ACK feedback for the PDSCH transmission(s) based at least in part on whether the UE successfully receives and/or decodes the PDSCH transmission(s) scheduled by the DCI. For example, due to coverage issues, penetration loss, beam blockage, and/or the like, the PDSCH transmission(s) scheduled by the DCI may fail to reach the UE 120. Alternatively, in some cases, the UE 120 may receive the PDSCH transmission(s) scheduled by the DCI, but the UE 120 may be unable to successfully decode the PDSCH transmission(s). In either case, the HARQ-ACK feedback generated by the UE 120 may include a NACK to request that the base station 110 retransmit the PDSCH(s). Alternatively, in cases where the UE 120 receives and successfully decodes the PDSCH transmission(s) scheduled by the DCI, the HARQ-ACK feedback generated by the UE 120 may include an ACK to indicate that the base station 110 does not need to retransmit the PDSCH(s). Accordingly, in some aspects, the UE 120 may prepare a UCI payload that includes the HARQ-ACK feedback for the PDSCH transmission(s) scheduled by the DCI to be transmitted to the base station 110 via one or more PUCCHs.

As shown by reference number 615, the UE 120 may transmit, to the base station 110, a group of one or more PUCCHs that include the HARQ-ACK feedback for the PDSCH transmission(s) scheduled by the DCI based at least in part on the indication that frequency hopping is to be applied to a transmission of the group of PUCCHs. In some aspects, the UE 120 may transmit the group of PUCCHs based at least in part on the PUCCH repetition factor and/or the PUCCH frequency hopping factor dynamically indicated in the scheduling DCI. For example, as described above, the DCI scheduling the PDSCH transmission(s) may indicate at least the PUCCH repetition factor to indicate the number of instances of the PUCCH that the UE 120 is to transmit for the PDSCH transmission(s) scheduled by the DCI. Furthermore, in some aspects, the DCI scheduling the PDSCH transmission(s) may further indicate a PUCCH frequency hopping factor to indicate the number of frequency hops in which the UE 120 is to transmit the PUCCH that includes the HARQ-ACK feedback for the PDSCH transmission(s) scheduled by the DCI.

Alternatively, and/or additionally, the one or more PUCCHs include HARQ-ACK feedback associated with semi-persistent scheduling (SPS), a scheduling request (SR), and/or CSI, among other examples.

As indicated above, FIG. 6 is provided as an example. Other examples may differ from what is described with respect to FIG. 6.

Figure 7:
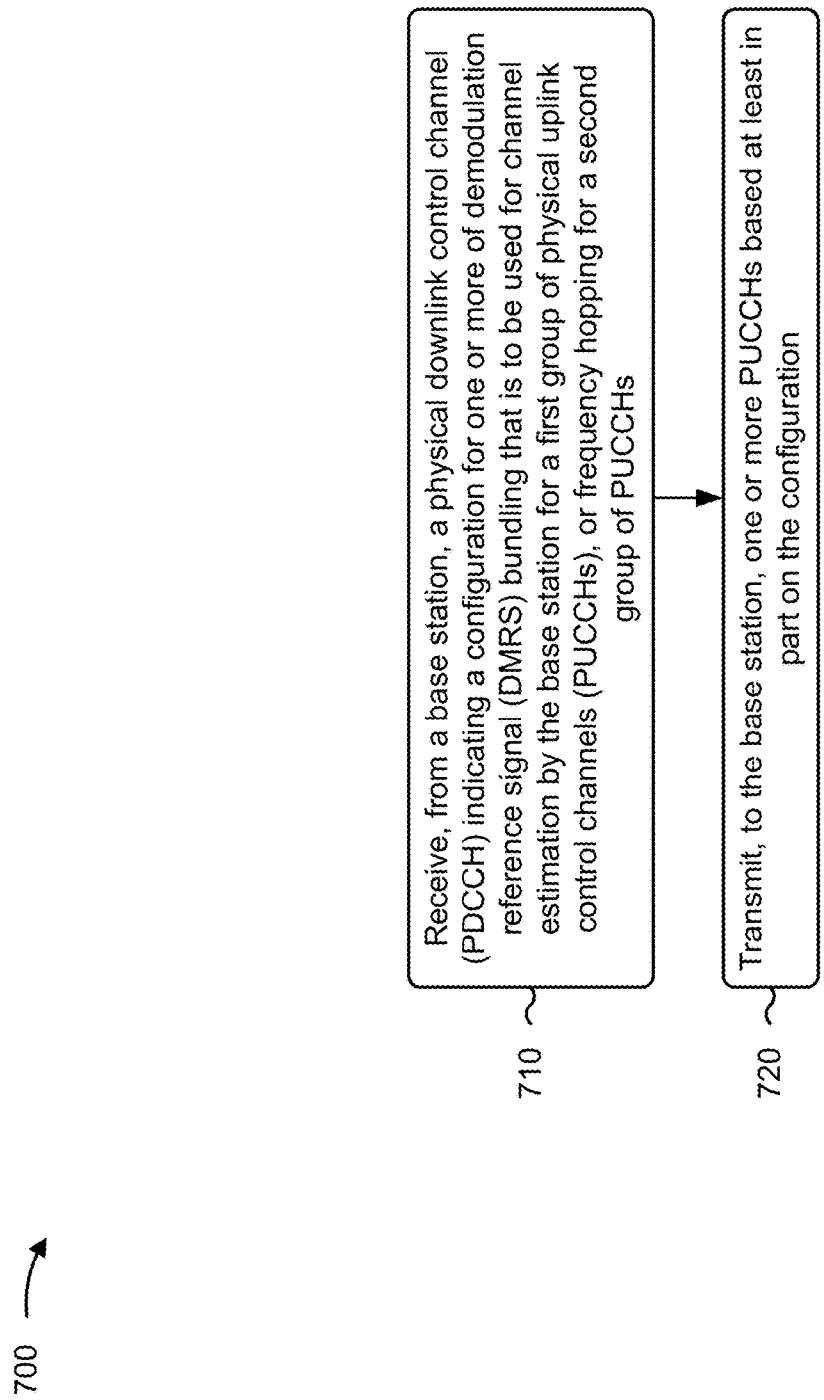
FIGS. 7 and 8 are diagrams illustrating example processes associated with dynamic indication of frequency hopping and DMRS bundling for PUCCH repetitions, in accordance with the present disclosure.

FIG. 7 is a diagram illustrating an example process 700 performed, for example, by an apparatus of a UE, in accordance with the present disclosure. Example process 700 is an example where the apparatus of a UE (e.g., an apparatus of UE 120) performs operations associated with techniques for dynamic indication of frequency hopping for PUCCH and DMRS bundling of PUCCH.

As shown in FIG. 7, in some aspects, process 700 may include receiving, from a base station, a PDCCH indicating a configuration for one or more of: DMRS bundling that is to be used for channel estimation by the base station for a first group of PUCCHs, or frequency hopping for a second group of PUCCHs (block 710). For example, the apparatus (e.g., using communication manager 140 and/or reception component 902, depicted in FIG. 9) may receive, from a base station, a PDCCH indicating a configuration for one or more of: DMRS bundling that is to be used for channel estimation by the base station for a first group of PUCCHs, or frequency hopping for a second group of PUCCHs, as described above. In some aspects, the first group of PUCCHs and the second group of PUCCHs may include the same one or more PUCCHs.

As shown in FIG. 7, in some aspects, process 700 may include transmitting, to the base station, one or more PUCCHs based at least in part on the configuration (block 720). For example, the apparatus (e.g., using communication manager 140 and/or transmission component 904, depicted in FIG. 9) may transmit, to the base station, one or more PUCCHs based at least in part on the configuration, as described above.

Process 700 may include additional aspects, such as any single aspect or any combination of aspects described below and/or in connection with one or more other processes described elsewhere herein.

In a first aspect, the configuration indicates the configuration for the DMRS bundling, and wherein the UE transmits the one or more PUCCHs based at least in part on the configuration by maintaining an uplink continuity among the DMRSs.

In a second aspect, alone or in combination with the first aspect, the uplink continuity among the DMRSs is maintained based at least in part on one or more of maintaining a phase continuity among the DMRSs, maintaining an amplitude continuity among the DMRSs, avoiding any change in an uplink spatial filtering, avoiding any change in an uplink precoding, avoiding any change in a timing advance.

In a third aspect, alone or in combination with one or more of the first and second aspects, the PDCCH includes DCI for scheduling resources for a PDSCH, and wherein a PRI bitfield of the DCI indicates that the DMRS bundling is to be used for the channel estimation by the base station for the first group of PUCCHs.

In a fourth aspect, alone or in combination with one or more of the first through third aspects, the PRI bitfield indicates a PUCCH resource, and wherein DMRS bundling is preconfigured for the PUCCH resource.

In a fifth aspect, alone or in combination with one or more of the first through fourth aspects, an index of a first CCE of the PDCCH indicates that the DMRS bundling is to be used for the channel estimation by the base station for the one or more PUCCHs.

In a sixth aspect, alone or in combination with one or more of the first through fifth aspects, the PDCCH includes DCI for scheduling resources for a PDSCH, and wherein the index of the first CCE of the PDCCH and a PRI bitfield of the DCI indicates that the DMRS bundling is to be used for the channel estimation by the base station for the one or more PUCCHs.

In a seventh aspect, alone or in combination with one or more of the first through sixth aspects, the index of the first CCE of the PDCCH and the PRI bitfield indicate a PUCCH resource, and wherein DMRS bundling is preconfigured for the PUCCH resource.

In an eighth aspect, alone or in combination with one or more of the first through seventh aspects, an aggregation level of the PDCCH indicates the configuration for the one or more of the DMRS bundling or the frequency hopping.

In a ninth aspect, alone or in combination with one or more of the first through eighth aspects, a C-RNTI that is used to mask a CRC of the PDCCH indicates the configuration for the one or more of the DMRS bundling or the frequency hopping.

In a tenth aspect, alone or in combination with one or more of the first through ninth aspects, the C-RNTI is shifted by a fixed number to indicate an alternative subset of PUCCH resources.

In an eleventh aspect, alone or in combination with one or more of the first through tenth aspects, one or more of a PDCCH DMRS sequence, a port of the UE, or an orthogonal cover code indicates the configuration of the one or more of the DMRS bundling or the frequency hopping.

In a twelfth aspect, alone or in combination with one or more of the first through eleventh aspects, a virtual cell identifier indicates the configuration of the frequency hopping.

In a thirteenth aspect, alone or in combination with one or more of the first through twelfth aspects, the PDCCH includes DCI for scheduling resources for a PDSCH, and wherein a TDRA bitfield of the DCI indicates the configuration for the one or more of the DMRS bundling or the frequency hopping.

In a fourteenth aspect, alone or in combination with one or more of the first through thirteenth aspects, a column of a TDRA table indicates the frequency hopping.

In a fifteenth aspect, alone or in combination with one or more of the first through fourteenth aspects, an SLIV or a function of the SLIV indicates the frequency hopping.

In a sixteenth aspect, alone or in combination with one or more of the first through fifteenth aspects, the frequency hopping is indicated based at least in part on whether the SLIV is an odd value or an even value.

In a seventeenth aspect, alone or in combination with one or more of the first through sixteenth aspects, the PDCCH includes DCI for scheduling resources for a PDSCH, and wherein an FDRA bitfield of the DCI indicates the configuration of the one or more of the DMRS bundling or the frequency hopping.

In an eighteenth aspect, alone or in combination with one or more of the first through seventeenth aspects, the FDRA bitfield of the DCI indicates the configuration of the one or more of the DMRS bundling or the frequency hopping based at least in part on whether a first RB index comprises an even value or an odd value.

In a nineteenth aspect, alone or in combination with one or more of the first through eighteenth aspects, the PDCCH indicates a PUCCH resource of one or more PUCCH resources, and wherein the PUCCH resource is preconfigured for DMRS bundling.

In a twentieth aspect, alone or in combination with one or more of the first through nineteenth aspects, DMRS bundling is configured per PUCCH resource.

In a twenty-first aspect, alone or in combination with one or more of the first through twentieth aspects, the PDCCH indicates an option, of a plurality of options, configured for a PUCCH resource of the one or more PUCCH resources, and wherein the option indicates that the DMRS bundling is to be used for channel estimation by the base station for the one or more PUCCH resources.

In a twenty-second aspect, alone or in combination with one or more of the first through twenty-first aspects, the PDCCH indicates a first configuration when only the DMRS bundling is to be used for channel estimation by the base station for the one or more PUCCHs, and wherein the PDCCH indicates a second configuration when only frequency hopping is to be applied to transmitting the one or more PUCCHs.

In a twenty-third aspect, alone or in combination with one or more of the first through twenty-second aspects, the PDCCH indicates the second configuration and a zero frequency offset, and wherein the PDCCH indicates that DMRS bundling is not to be used for channel estimation by the base station for the one or more PUCCHs and that frequency hopping is not to be used for the one or more PUCCHs based at least in part on the PDCCH indicating the second configuration with the zero frequency offset.

In a twenty-fourth aspect, alone or in combination with one or more of the first through twenty-third aspects, the PDCCH indicates the first configuration or the second configuration based at least in part on a format of the PUCCH.

In a twenty-fifth aspect, alone or in combination with one or more of the first through twenty-fourth aspects, the PDCCH indicates the first configuration or the second configuration based at least in part on one or more of a frequency range of the PUCCH, a frequency band of the PUCCH, or an SCS of the PUCCH.

In a twenty-sixth aspect, alone or in combination with one or more of the first through twenty-fifth aspects, the PDCCH includes DCI scheduling a PDSCH, and wherein the DCI and one or more parameters of the PDCCH indicate the frequency hopping for the one or more PUCCHs.

In a twenty-seventh aspect, alone or in combination with one or more of the first through twenty-sixth aspects, the DCI includes a PRI that identifies a slot in which HARQ feedback is to be transmitted, and wherein the frequency hopping for the one or more PUCCHs is indicated by the one or more parameters of the PDCCH and the PRI, the one or more parameters of the PDCCH and content of the DCI that is different from the PRI, the one or more parameters of the PDCCH, the PRI, and the content of the DCI that is different from the PRI, the content of the DCI that is different from the PRI, or the PRI and the content of the DCI that is different from the PRI.

In a twenty-eighth aspect, alone or in combination with one or more of the first through twenty-seventh aspects, the one or more parameters of the PDCCH include one or more of a number of repetitions indicated for the PDSCH, or a TPC command.

In a twenty-ninth aspect, alone or in combination with one or more of the first through twenty-eighth aspects, the configuration is for the frequency hopping based at least in part on whether a dynamic indication of frequency hopping by the PDCCH for the one or more PUCCHs is applied to the one or more PUCCHs.

In a thirtieth aspect, alone or in combination with one or more of the first through twenty-ninth aspects, the PDCCH includes DCI scheduling a PDSCH, and wherein the one or more PUCCHs include HARQ-ACK feedback associated with the PDSCH.

In a thirty-first aspect, alone or in combination with one or more of the first through thirtieth aspects, the one or more PUCCHs include HARQ-ACK feedback associated with SPS.

In a thirty-second aspect, alone or in combination with one or more of the first through thirty-first aspects, the one or more PUCCHs include an SR.

In a thirty-third aspect, alone or in combination with one or more of the first through thirty-second aspects, the one or more PUCCHs include CSI.

In a thirty-fourth aspect, alone or in combination with one or more of the first through thirty-third aspects, the configuration is for the frequency hopping, and wherein a PUCCH resource configuration for the one or more PUCCHs indicates a frequency offset associated with the frequency hopping.

In a thirty-fifth aspect, alone or in combination with one or more of the first through thirty-fourth aspects, the PUCCH resource configuration indicates a starting RB and a second hop RB associated with the frequency hopping.

In a thirty-sixth aspect, alone or in combination with one or more of the first through thirty-fifth aspects, the configuration is applied to the one or more PUCCHs semi-persistently.

In a thirty-seventh aspect, alone or in combination with one or more of the first through thirty-sixth aspects, the configuration is applied until overridden by another configuration.

In a thirty-eighth aspect, alone or in combination with one or more of the first through thirty-seventh aspects, the configuration is applied for a time period that is preconfigured for the one or more PUCCHs.

In a thirty-ninth aspect, alone or in combination with one or more of the first through thirty-eighth aspects, transmitting the one or more PUCCHs includes transmitting, to the base station, a PUCCH that includes HARQ-ACK feedback associated with the PDSCH, wherein one or more instances of the PUCCH are transmitted across one or more uplink slots or sub-slots based at least in part on the configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
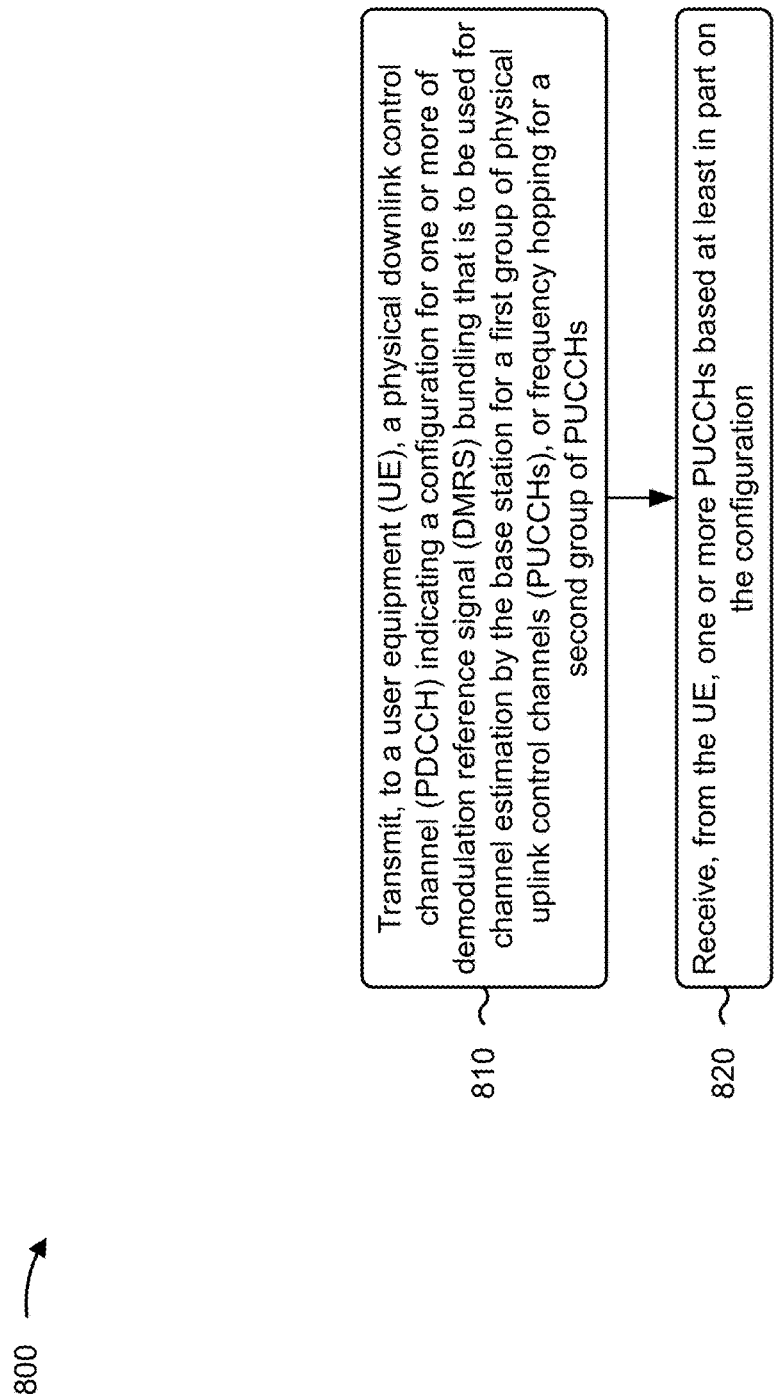

FIG. 8 is a diagram illustrating an example process 800 performed, for example, by an apparatus of a base station, in accordance with the present disclosure. Example process 800 is an example where the apparatus of a base station (e.g., an apparatus of base station 110) performs operations associated with techniques for dynamic indication of frequency hopping for PUCCH and DMRS bundling of PUCCH.

As shown in FIG. 8, in some aspects, process 800 may include transmitting, to a UE, a PDCCH indicating a configuration for one or more of: DMRS bundling that is to be used for channel estimation by the base station for a first group of PUCCHs, or frequency hopping for a second group of PUCCHs (block 810). For example, the apparatus (e.g., using communication manager 150 and/or transmission component 1004, depicted in FIG. 10) may transmit, to a UE, a PDCCH indicating a configuration for one or more of: DMRS bundling that is to be used for channel estimation by the base station for a first group of PUCCHs, or frequency hopping for a second group of PUCCHs, as described above.

As shown in FIG. 8, in some aspects, process 800 may include receiving, from the UE, one or more PUCCHs based at least in part on the configuration (block 820). For example, the apparatus (e.g., using communication manager 150 and/or reception component 1002, depicted in FIG. 10) may receive, from the UE, one or more PUCCHs based at least in part on the configuration, as described above.

Process 800 may include additional aspects, such as any single aspect or any combination of aspects described below and/or in connection with one or more other processes described elsewhere herein.

In a first aspect, the configuration indicates the configuration for the DMRS bundling, and wherein the UE transmits the one or more PUCCHs based at least in part on the configuration by maintaining an uplink continuity among the DMRSs.

In a second aspect, alone or in combination with the first aspect, the uplink continuity among the DMRSs is maintained based at least in part on one or more of maintaining a phase continuity among the DMRSs, maintaining an amplitude continuity among the DMRSs, avoiding any change in an uplink spatial filtering, avoiding any change in an uplink precoding, avoiding any change in a timing advance.

In a third aspect, alone or in combination with one or more of the first and second aspects, the PDCCH includes DCI for scheduling resources for a PDSCH, and wherein a PRI bitfield of the DCI indicates that the DMRS bundling is to be used for the channel estimation by the base station for the first group of PUCCHs.

In a fourth aspect, alone or in combination with one or more of the first through third aspects, the PRI bitfield indicates a PUCCH resource, and wherein DMRS bundling is preconfigured for the PUCCH resource.

In a fifth aspect, alone or in combination with one or more of the first through fourth aspects, an index of a first CCE of the PDCCH indicates that the DMRS bundling is to be used for the channel estimation by the base station for the one or more PUCCHs.

In a sixth aspect, alone or in combination with one or more of the first through fifth aspects, the PDCCH includes DCI for scheduling resources for a PDSCH, and wherein the index of the first CCE of the PDCCH and a PRI bitfield of the DCI indicates that the DMRS bundling is to be used for the channel estimation by the base station for the one or more PUCCHs.

In a seventh aspect, alone or in combination with one or more of the first through sixth aspects, the index of the first CCE of the PDCCH and the PRI bitfield indicate a PUCCH resource, and wherein DMRS bundling is preconfigured for the PUCCH resource.

In an eighth aspect, alone or in combination with one or more of the first through seventh aspects, an aggregation level of the PDCCH indicates the configuration for the one or more of the DMRS bundling or the frequency hopping.

In a ninth aspect, alone or in combination with one or more of the first through eighth aspects, a C-RNTI that is used to mask a CRC of the PDCCH indicates the configuration for the one or more of the DMRS bundling or the frequency hopping.

In a tenth aspect, alone or in combination with one or more of the first through ninth aspects, the C-RNTI is shifted by a fixed number to indicate an alternative subset of PUCCH resources.

In an eleventh aspect, alone or in combination with one or more of the first through tenth aspects, one or more of a PDCCH DMRS sequence, a port of the UE, or an orthogonal cover code indicates the configuration of the one or more of the DMRS bundling or the frequency hopping.

In a twelfth aspect, alone or in combination with one or more of the first through eleventh aspects, a virtual cell identifier indicates the configuration of the frequency hopping.

In a thirteenth aspect, alone or in combination with one or more of the first through twelfth aspects, the PDCCH includes DCI for scheduling resources for a PDSCH, and wherein a TDRA bitfield of the DCI indicates the configuration for the one or more of the DMRS bundling or the frequency hopping.

In a fourteenth aspect, alone or in combination with one or more of the first through thirteenth aspects, a column of a TDRA table indicates the frequency hopping.

In a fifteenth aspect, alone or in combination with one or more of the first through fourteenth aspects, an SLIV or a function of the SLIV indicates the frequency hopping.

In a sixteenth aspect, alone or in combination with one or more of the first through fifteenth aspects, the frequency hopping is indicated based at least in part on whether the SLIV is an odd value or an even value.

In a seventeenth aspect, alone or in combination with one or more of the first through sixteenth aspects, the PDCCH includes DCI for scheduling resources for a PDSCH, and wherein an FDRA bitfield of the DCI indicates the configuration of the one or more of the DMRS bundling or frequency hopping.

In an eighteenth aspect, alone or in combination with one or more of the first through seventeenth aspects, the FDRA bitfield of the DCI indicates the configuration of the one or more of the DMRS bundling or the frequency hopping based at least in part on whether a first RB index comprises an even value or an odd value.

In a nineteenth aspect, alone or in combination with one or more of the first through eighteenth aspects, the PDCCH indicates a PUCCH resource of one or more PUCCH resources, and wherein the PUCCH resource is preconfigured for DMRS bundling.

In a twentieth aspect, alone or in combination with one or more of the first through nineteenth aspects, DMRS bundling is configured per PUCCH resource.

In a twenty-first aspect, alone or in combination with one or more of the first through twentieth aspects, the PDCCH indicates an option, of a plurality of options, configured for a PUCCH resource of the one or more PUCCH resources, and wherein the option indicates that the DMRS bundling is to be used for channel estimation by the base station for the one or more PUCCH resources.

In a twenty-second aspect, alone or in combination with one or more of the first through twenty-first aspects, the PDCCH indicates a first configuration when only the DMRS bundling is to be used for channel estimation by the base station for the one or more PUCCHs, and wherein the PDCCH indicates a second configuration when only frequency hopping is to be applied to transmitting the one or more PUCCHs.

In a twenty-third aspect, alone or in combination with one or more of the first through twenty-second aspects, the PDCCH indicates the second configuration and a zero frequency offset, and wherein the PDCCH indicates that DMRS bundling is not to be used for channel estimation by the base station for the one or more PUCCHs and that frequency hopping is not to be used for the one or more PUCCHs based at least in part on the PDCCH indicating the second configuration with the zero frequency offset.

In a twenty-fourth aspect, alone or in combination with one or more of the first through twenty-third aspects, the PDCCH indicates the first configuration or the second configuration based at least in part on a format of the PUCCH.

In a twenty-fifth aspect, alone or in combination with one or more of the first through twenty-fourth aspects, the PDCCH indicates the first configuration or the second configuration based at least in part on one or more of a frequency range of the PUCCH, a frequency band of the PUCCH, or an SCS of the PUCCH.

In a twenty-sixth aspect, alone or in combination with one or more of the first through twenty-fifth aspects, the PDCCH includes DCI scheduling a PDSCH, and wherein the DCI and one or more parameters of the PDCCH indicate the frequency hopping for the one or more PUCCHs.

In a twenty-seventh aspect, alone or in combination with one or more of the first through twenty-sixth aspects, the DCI includes a PRI that identifies a slot in which HARQ feedback is to be transmitted, and wherein the frequency hopping for the one or more PUCCHs is indicated by the one or more parameters of the PDCCH and the PRI, the one or more parameters of the PDCCH and content of the DCI that is different from the PRI, the one or more parameters of the PDCCH, the PRI, and the content of the DCI that is different from the PRI, the content of the DCI that is different from the PRI, or the PRI and the content of the DCI that is different from the PRI.

In a twenty-eighth aspect, alone or in combination with one or more of the first through twenty-seventh aspects, the one or more parameters of the PDCCH include one or more of a number of repetitions indicated for the PDSCH, or a TPC command.

In a twenty-ninth aspect, alone or in combination with one or more of the first through twenty-eighth aspects, the configuration is for the frequency hopping based at least in part on whether a dynamic indication of frequency hopping by the PDCCH for the one or more PUCCHs is applied to the one or more PUCCHs.

In a thirtieth aspect, alone or in combination with one or more of the first through twenty-ninth aspects, the PDCCH includes DCI scheduling a PDSCH, and wherein the one or more PUCCHs include HARQ-ACK feedback associated with the PDSCH.

In a thirty-first aspect, alone or in combination with one or more of the first through thirtieth aspects, the one or more PUCCHs include HARQ-ACK feedback associated with SPS.

In a thirty-second aspect, alone or in combination with one or more of the first through thirty-first aspects, the one or more PUCCHs include an SR.

In a thirty-third aspect, alone or in combination with one or more of the first through thirty-second aspects, the one or more PUCCHs include CSI.

In a thirty-fourth aspect, alone or in combination with one or more of the first through thirty-third aspects, the configuration is for the frequency hopping, and wherein a PUCCH resource configuration for the one or more PUCCHs indicates a frequency offset associated with the frequency hopping.

In a thirty-fifth aspect, alone or in combination with one or more of the first through thirty-fourth aspects, the PUCCH resource configuration indicates a starting RB and a second hop RB associated with the frequency hopping.

In a thirty-sixth aspect, alone or in combination with one or more of the first through thirty-fifth aspects, the configuration is applied to the one or more PUCCHs semi-persistently.

In a thirty-seventh aspect, alone or in combination with one or more of the first through thirty-sixth aspects, the configuration is applied until overridden by another configuration.

In a thirty-eighth aspect, alone or in combination with one or more of the first through thirty-seventh aspects, the configuration is applied for a time period that is preconfigured for the one or more PUCCHs.

In a thirty-ninth aspect, alone or in combination with one or more of the first through thirty-eighth aspects, receiving the one or more PUCCHs includes receiving, from the UE, a PUCCH that includes HARQ-ACK feedback associated with the PDSCH, wherein one or more instances of the PUCCH are transmitted across one or more uplink slots or sub-slots based at least in part on the configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
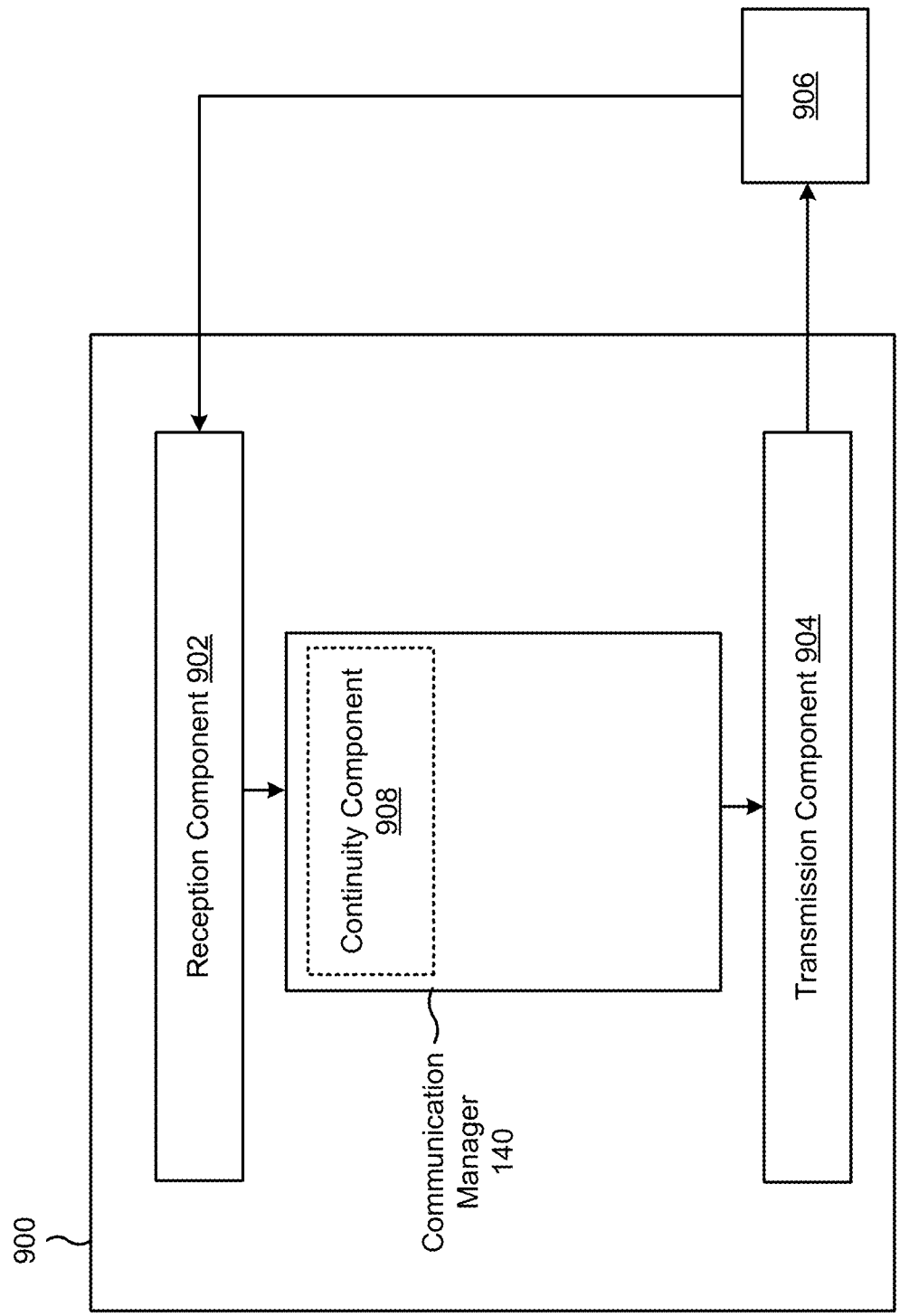
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a continuity component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a base station, a PDCCH indicating a configuration for one or more of DMRS bundling that is to be used for channel estimation by the base station for a first group of PUCCHs, or frequency hopping for a second group of PUCCHs. The transmission component may transmit, to the base station, one or more PUCCHs based at least in part on the configuration.

In some aspects, the continuity component 908 may maintain an uplink continuity among the DMRSs.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
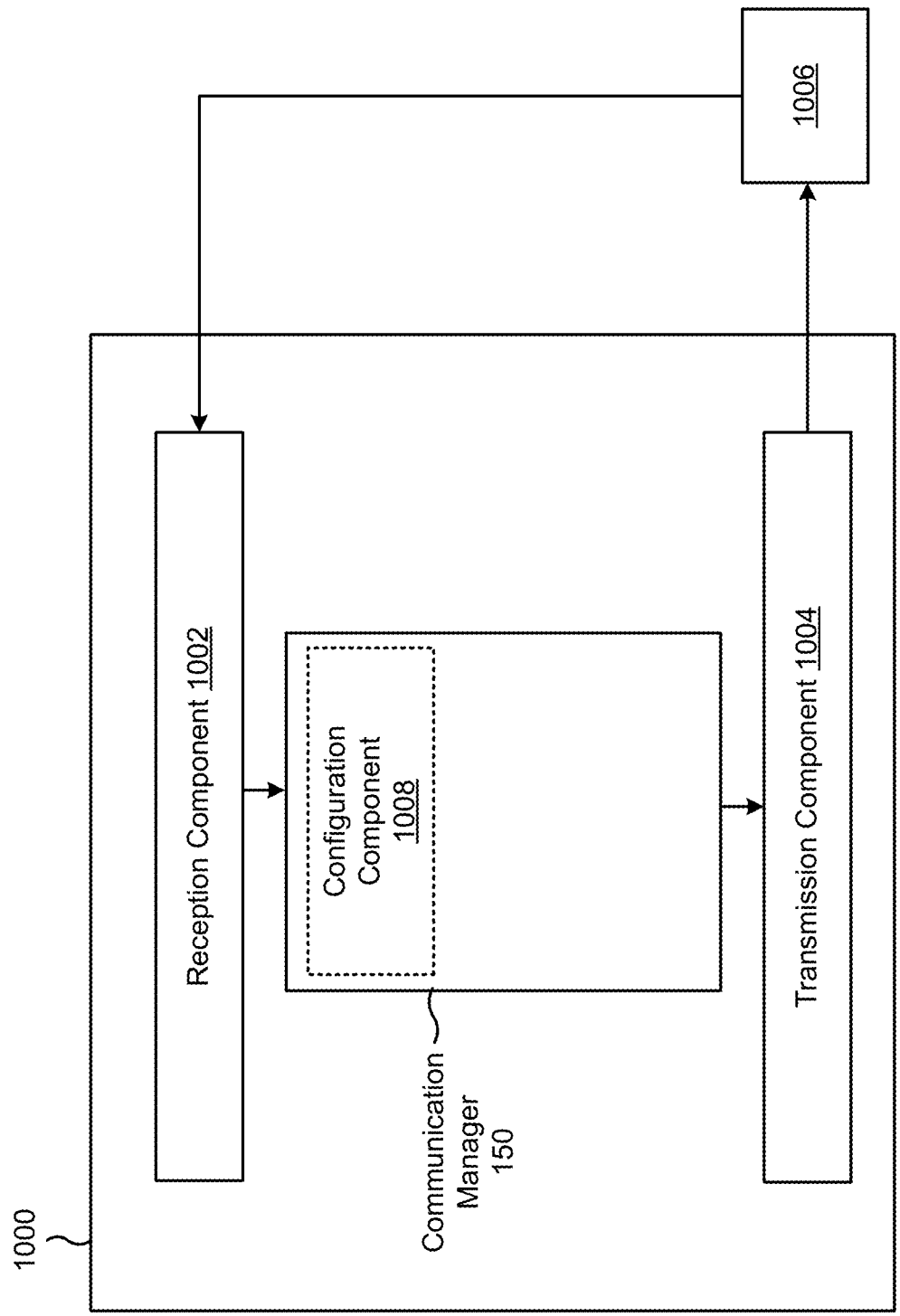

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a configuration component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit, to a UE, a PDCCH indicating a configuration for one or more of: DMRS bundling that is to be used for channel estimation by the base station for a first group of PUCCHs, or frequency hopping for a second group of PUCCHs. The reception component 1002 may receive, from the UE, one or more PUCCHs based at least in part on the configuration.

In some aspects, the configuration component 1008 may preconfigure DMRS bundling and/or frequency hopping for a PUCCH resource.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by an apparatus of a UE, comprising: receiving, from a base station, a PDCCH indicating a configuration for one or more of: DMRS bundling that is to be used for channel estimation by the base station for a first group of PUCCHs, or frequency hopping for a second group of PUCCHs; and transmitting, to the base station, one or more PUCCHs based at least in part on the configuration.

Aspect 2: The method of Aspect 1, wherein the configuration indicates the configuration for the DMRS bundling, and wherein the UE transmits the one or more PUCCHs based at least in part on the configuration by maintaining an uplink continuity among the DMRSs.

Aspect 3: The method of Aspect 2, wherein the uplink continuity among the DMRSs is maintained based at least in part on one or more of: maintaining a phase continuity among the DMRSs, maintaining an amplitude continuity among the DMRSs, avoiding any change in an uplink spatial filtering, avoiding any change in an uplink precoding, avoiding any change in a timing advance.

Aspect 4: The method of one or more of Aspects 1 through 3, wherein the PDCCH includes DCI for scheduling resources for a PDSCH, and wherein a PRI bitfield of the DCI indicates that the DMRS bundling is to be used for the channel estimation by the base station for the first group of PUCCHs.

Aspect 5: The method of Aspect 4, wherein the PRI bitfield indicates a PUCCH resource, and wherein DMRS bundling is preconfigured for the PUCCH resource.

Aspect 6: The method of one or more of Aspects 1 through 5, wherein an index of a first CCE of the PDCCH indicates that the DMRS bundling is to be used for the channel estimation by the base station for the one or more PUCCHs.

Aspect 7: The method of Aspect 6, wherein the PDCCH includes DCI for scheduling resources for a PDSCH, and wherein the index of the first CCE of the PDCCH and a PRI bitfield of the DCI indicates that the DMRS bundling is to be used for the channel estimation by the base station for the one or more PUCCHs.

Aspect 8: The method of Aspect 7, wherein the index of the first CCE of the PDCCH and the PRI bitfield indicate a PUCCH resource, and wherein DMRS bundling is preconfigured for the PUCCH resource.

Aspect 9: The method of one or more of Aspects 1 through 8, wherein an aggregation level of the PDCCH indicates the configuration for the one or more of the DMRS bundling or the frequency hopping.

Aspect 10: The method of one or more of Aspects 1 through 9, wherein a C-RNTI that is used to mask a CRC of the PDCCH indicates the configuration for the one or more of the DMRS bundling or the frequency hopping.

Aspect 11: The method of Aspect 10, wherein the C-RNTI is shifted by a fixed number to indicate an alternative subset of PUCCH resources.

Aspect 12: The method of one or more of Aspects 1 through 11, wherein one or more of a PDCCH DMRS sequence, a port of the UE, or an orthogonal cover code indicates the configuration of the one or more of the DMRS bundling or the frequency hopping.

Aspect 13: The method of one or more of Aspects 1 through 12, wherein a virtual cell identifier indicates the configuration of the frequency hopping.

Aspect 14: The method of one or more of Aspects 1 through 13, wherein the PDCCH includes DCI for scheduling resources for a PDSCH, and wherein a TDRA bitfield of the DCI indicates the configuration for the one or more of the DMRS bundling or the frequency hopping.

Aspect 15: The method of Aspect 14, wherein a column of a TDRA table indicates the frequency hopping.

Aspect 16: The method of Aspect 14, wherein an SLIV or a function of the SLIV indicates the frequency hopping.

Aspect 17: The method of Aspect 16, wherein the frequency hopping is indicated based at least in part on whether the SLIV is an odd value or an even value.

Aspect 18: The method of one or more of Aspects 1 through 17, wherein the PDCCH includes DCI for scheduling resources for a PDSCH, and wherein an FDRA bitfield of the DCI indicates the configuration of the one or more of the DMRS bundling or the frequency hopping.

Aspect 19: The method of Aspect 18, wherein the FDRA bitfield of the DCI indicates the configuration of the one or more of the DMRS bundling or the frequency hopping based at least in part on whether a first RB index comprises an even value or an odd value.

Aspect 20: The method of one or more of Aspects 1 through 19, wherein the PDCCH indicates a PUCCH resource of one or more PUCCH resources, and wherein the PUCCH resource is preconfigured for DMRS bundling.

Aspect 21: The method of one or more of Aspects 1 through 20, wherein DMRS bundling is configured per PUCCH resource.

Aspect 22: The method of one or more of Aspects 1 through 21, wherein the PDCCH indicates an option, of a plurality of options, configured for a PUCCH resource of the one or more PUCCH resources, and wherein the option indicates that the DMRS bundling is to be used for channel estimation by the base station for the one or more PUCCH resources.

Aspect 23: The method of one or more of Aspects 1 through 22, wherein the PDCCH indicates a first configuration when only the DMRS bundling is to be used for channel estimation by the base station for the one or more PUCCHs, and wherein the PDCCH indicates a second configuration when only frequency hopping is to be applied to transmitting the one or more PUCCHs.

Aspect 24: The method of Aspect 23, wherein the PDCCH indicates the second configuration and a zero frequency offset, and wherein the PDCCH indicates that DMRS bundling is not to be used for channel estimation by the base station for the one or more PUCCHs and that frequency hopping is not to be used for the one or more PUCCHs based at least in part on the PDCCH indicating the second configuration with the zero frequency offset.

Aspect 25: The method of Aspect 23, wherein the PDCCH indicates the first configuration or the second configuration based at least in part on a format of the PUCCH.

Aspect 26: The method of Aspect 23, wherein the PDCCH indicates the first configuration or the second configuration based at least in part on one or more of a frequency range of the PUCCH, a frequency band of the PUCCH, or an SCS of the PUCCH.

Aspect 27: The method of one or more of Aspects 1 through 26, wherein the PDCCH includes DCI scheduling a PDSCH, and wherein the DCI and one or more parameters of the PDCCH indicate the frequency hopping for the one or more PUCCHs.

Aspect 28: The method of Aspect 27, wherein the DCI includes a PRI that identifies a slot in which HARQ feedback is to be transmitted, and wherein the frequency hopping for the one or more PUCCHs is indicated by: the one or more parameters of the PDCCH and the PRI, the one or more parameters of the PDCCH and content of the DCI that is different from the PRI, the one or more parameters of the PDCCH, the PRI, and the content of the DCI that is different from the PRI, the content of the DCI that is different from the PRI, or the PRI and the content of the DCI that is different from the PRI.

Aspect 29: The method of Aspect 27, wherein the one or more parameters of the PDCCH include one or more of: a number of repetitions indicated for the PDSCH, or a TPC command.

Aspect 30: The method of one or more of Aspects 1 through 29, wherein the configuration is for the frequency hopping based at least in part on whether a dynamic indication of frequency hopping by the PDCCH for the one or more PUCCHs is applied to the one or more PUCCHs.

Aspect 31: The method of one or more of Aspects 1 through 30, wherein the PDCCH includes DCI scheduling a PDSCH, and wherein the one or more PUCCHs include HARQ-ACK feedback associated with the PDSCH.

Aspect 32: The method of one or more of Aspects 1 through 31, wherein the one or more PUCCHs include HARQ-ACK feedback associated with SPS.

Aspect 33: The method of one or more of Aspects 1 through 32, wherein the one or more PUCCHs include an SR.

Aspect 34: The method of one or more of Aspects 1 through 33, wherein the one or more PUCCHs include CSI.

Aspect 35: The method of one or more of Aspects 1 through 34, wherein the configuration is for the frequency hopping, and wherein a PUCCH resource configuration for the one or more PUCCHs indicates a frequency offset associated with the frequency hopping.

Aspect 36: The method of Aspect 35, wherein the PUCCH resource configuration indicates a starting RB and a second hop RB associated with the frequency hopping.

Aspect 37: The method of one or more of Aspects 1 through 36, wherein the configuration is applied to the one or more PUCCHs semi-persistently.

Aspect 38: The method of one or more of Aspects 1 through 37, wherein the configuration is applied until overridden by another configuration.

Aspect 39: The method of one or more of Aspects 1 through 38, wherein the configuration is applied for a time period that is preconfigured for the one or more PUCCHs.

Aspect 40: The method of one or more of Aspects 1 through 39, wherein transmitting the one or more PUCCHs includes: transmitting, to the base station, a PUCCH that includes HARQ-ACK feedback associated with the PDSCH, wherein one or more instances of the PUCCH are transmitted across one or more uplink slots or sub-slots based at least in part on the configuration.

Aspect 41: A method of wireless communication performed by an apparatus of a base station, comprising: transmitting, to a UE, a PDCCH indicating a configuration for one or more of: DMRS bundling that is to be used for channel estimation by the base station for a first group of PUCCHs, or frequency hopping for a second group of PUCCHs; and receiving, from the UE, one or more PUCCHs based at least in part on the configuration.

Aspect 42: The method of Aspect 41, wherein the configuration indicates the configuration for the DMRS bundling, and wherein the UE transmits the one or more PUCCHs based at least in part on the configuration by maintaining an uplink continuity among the DMRSs.

Aspect 43: The method of Aspect 42, wherein the uplink continuity among the DMRSs is maintained based at least in part on one or more of: maintaining a phase continuity among the DMRSs, maintaining an amplitude continuity among the DMRSs, avoiding any change in an uplink spatial filtering, avoiding any change in an uplink precoding, avoiding any change in a timing advance.

Aspect 44: The method of one or more of Aspects 41 through 43, wherein the PDCCH includes DCI for scheduling resources for a PDSCH, and wherein a PRI bitfield of the DCI indicates that the DMRS bundling is to be used for the channel estimation by the base station for the first group of PUCCHs.

Aspect 45: The method of Aspect 44, wherein the PRI bitfield indicates a PUCCH resource, and wherein DMRS bundling is preconfigured for the PUCCH resource.

Aspect 46: The method of one or more of Aspects 41 through 45, wherein an index of a first CCE of the PDCCH indicates that the DMRS bundling is to be used for the channel estimation by the base station for the one or more PUCCHs.

Aspect 47: The method of Aspect 46, wherein the PDCCH includes DCI for scheduling resources for a PDSCH, and wherein the index of the first CCE of the PDCCH and a PRI bitfield of the DCI indicates that the DMRS bundling is to be used for the channel estimation by the base station for the one or more PUCCHs.

Aspect 48: The method of Aspect 47, wherein the index of the first CCE of the PDCCH and the PRI bitfield indicate a PUCCH resource, and wherein DMRS bundling is preconfigured for the PUCCH resource.

Aspect 49: The method of one or more of Aspects 41 through 48, wherein an aggregation level of the PDCCH indicates the configuration for the one or more of the DMRS bundling or the frequency hopping.

Aspect 50: The method of one or more of Aspects 41 through 49, wherein a C-RNTI that is used to mask a CRC of the PDCCH indicates the configuration for the one or more of the DMRS bundling or the frequency hopping.

Aspect 51: The method of Aspect 50, wherein the C-RNTI is shifted by a fixed number to indicate an alternative subset of PUCCH resources.

Aspect 52: The method of one or more of Aspects 41 through 51, wherein one or more of a PDCCH DMRS sequence, a port of the UE, or an orthogonal cover code indicates the configuration of the one or more of the DMRS bundling or the frequency hopping.

Aspect 53: The method of one or more of Aspects 41 through 52, wherein a virtual cell identifier indicates the configuration of the frequency hopping.

Aspect 54: The method of one or more of Aspects 41 through 53, wherein the PDCCH includes DCI for scheduling resources for a PDSCH, and wherein a TDRA bitfield of the DCI indicates the configuration for the one or more of the DMRS bundling or the frequency hopping.

Aspect 55: The method of Aspect 54, wherein a column of a TDRA table indicates the frequency hopping.

Aspect 56: The method of Aspect 54, wherein an SLIV or a function of the SLIV indicates the frequency hopping.

Aspect 57: The method of Aspect 56, wherein the frequency hopping is indicated based at least in part on whether the SLIV is an odd value or an even value.

Aspect 58: The method of one or more of Aspects 41 through 57, wherein the PDCCH includes DCI for scheduling resources for a PDSCH, and wherein an FDRA bitfield of the DCI indicates the configuration of the one or more of the DMRS bundling or the frequency hopping.

Aspect 59: The method of Aspect 58, wherein the FDRA bitfield of the DCI indicates the configuration of the one or more of the DMRS bundling or the frequency hopping based at least in part on whether a first RB index comprises an even value or an odd value.

Aspect 60: The method of one or more of Aspects 41 through 59, wherein the PDCCH indicates a PUCCH resource of one or more PUCCH resources, and wherein the PUCCH resource is preconfigured for DMRS bundling.

Aspect 61: The method of one or more of Aspects 41 through 60, wherein DMRS bundling is configured per PUCCH resource.

Aspect 62: The method of one or more of Aspects 41 through 61, wherein the PDCCH indicates an option, of a plurality of options, configured for a PUCCH resource of the one or more PUCCH resources, and wherein the option indicates that the DMRS bundling is to be used for channel estimation by the base station for the one or more PUCCH resources.

Aspect 63: The method of one or more of Aspects 41 through 62, wherein the PDCCH indicates a first configuration when only the DMRS bundling is to be used for channel estimation by the base station for the one or more PUCCHs, and wherein the PDCCH indicates a second configuration when only frequency hopping is to be applied to transmitting the one or more PUCCHs.

Aspect 64: The method of Aspect 63, wherein the PDCCH indicates the second configuration and a zero frequency offset, and wherein the PDCCH indicates that DMRS bundling is not to be used for channel estimation by the base station for the one or more PUCCHs and that frequency hopping is not to be used for the one or more PUCCHs based at least in part on the PDCCH indicating the second configuration with the zero frequency offset.

Aspect 65: The method of Aspect 63, wherein the PDCCH indicates the first configuration or the second configuration based at least in part on a format of the PUCCH.

Aspect 66: The method of Aspect 63, wherein the PDCCH indicates the first configuration or the second configuration based at least in part on one or more of a frequency range of the PUCCH, a frequency band of the PUCCH, or an SCS of the PUCCH.

Aspect 67: The method of one or more of Aspects 41 through 66, wherein the PDCCH includes DCI scheduling a PDSCH, and wherein the DCI and one or more parameters of the PDCCH indicate the frequency hopping for the one or more PUCCHs.

Aspect 68: The method of Aspect 67, wherein the DCI includes a PRI that identifies a slot in which HARQ feedback is to be transmitted, and wherein the frequency hopping for the one or more PUCCHs is indicated by: the one or more parameters of the PDCCH and the PRI, the one or more parameters of the PDCCH and content of the DCI that is different from the PRI, the one or more parameters of the PDCCH, the PRI, and the content of the DCI that is different from the PRI, the content of the DCI that is different from the PRI, or the PRI and the content of the DCI that is different from the PRI.

Aspect 69: The method of Aspect 67, wherein the one or more parameters of the PDCCH include one or more of: a number of repetitions indicated for the PDSCH, or a TPC command.

Aspect 70: The method of one or more of Aspects 41 through 69, wherein the configuration is for the frequency hopping based at least in part on whether a dynamic indication of frequency hopping by the PDCCH for the one or more PUCCHs is applied to the one or more PUCCHs.

Aspect 71: The method of one or more of Aspects 41 through 70, wherein the PDCCH includes DCI scheduling a PDSCH, and wherein the one or more PUCCHs include HARQ-ACK feedback associated with the PDSCH.

Aspect 72: The method of one or more of Aspects 41 through 71, wherein the one or more PUCCHs include HARQ-ACK feedback associated with SPS.

Aspect 73: The method of one or more of Aspects 41 through 72, wherein the one or more PUCCHs include an SR.

Aspect 74: The method of one or more of Aspects 41 through 73, wherein the one or more PUCCHs include CSI.

Aspect 75: The method of one or more of Aspects 41 through 74, wherein the configuration is for the frequency hopping, and wherein a PUCCH resource configuration for the one or more PUCCHs indicates a frequency offset associated with the frequency hopping.

Aspect 76: The method of Aspect 75, wherein the PUCCH resource configuration indicates a starting RB and a second hop RB associated with the frequency hopping.

Aspect 77: The method of one or more of Aspects 41 through 76, wherein the configuration is applied to the one or more PUCCHs semi-persistently.

Aspect 78: The method of one or more of Aspects 41 through 77, wherein the configuration is applied until overridden by another configuration.

Aspect 79: The method of one or more of Aspects 41 through 78, wherein the configuration is applied for a time period that is preconfigured for the one or more PUCCHs.

Aspect 80: The method of one or more of Aspects 41 through 79, wherein receiving the one or more PUCCHs includes: receiving, from the UE, a PUCCH that includes HARQ-ACK feedback associated with the PDSCH, wherein one or more instances of the PUCCH are transmitted across one or more uplink slots or sub-slots based at least in part on the configuration.

Aspect 81: An apparatus for wireless communication at a device, comprising a processor; memory coupled with the processor; and instructions stored in the memory and executable by the processor to cause the apparatus to perform the method of one or more of Aspects 1 through 40.

Aspect 82: A device for wireless communication, comprising a memory and one or more processors coupled to the memory, the one or more processors configured to perform the method of one or more of Aspects 1 through 40.

Aspect 83: An apparatus for wireless communication, comprising at least one means for performing the method of one or more of Aspects 1 through 40.

Aspect 84: A non-transitory computer-readable medium storing code for wireless communication, the code comprising instructions executable by a processor to perform the method of one or more of Aspects 1 through 40.

Aspect 85: A non-transitory computer-readable medium storing a set of instructions for wireless communication, the set of instructions comprising one or more instructions that, when executed by one or more processors of a device, cause the device to perform the method of one or more of Aspects 1 through 40.

Aspect 86: An apparatus for wireless communication at a device, comprising a processor; memory coupled with the processor; and instructions stored in the memory and executable by the processor to cause the apparatus to perform the method of one or more of Aspects 41 through 80.

Aspect 87: A device for wireless communication, comprising a memory and one or more processors coupled to the memory, the one or more processors configured to perform the method of one or more of Aspects 41 through 80.

Aspect 88: An apparatus for wireless communication, comprising at least one means for performing the method of one or more of Aspects 41 through 80.

Aspect 89: A non-transitory computer-readable medium storing code for wireless communication, the code comprising instructions executable by a processor to perform the method of one or more of Aspects 41 through 80.

Aspect 90: A non-transitory computer-readable medium storing a set of instructions for wireless communication, the set of instructions comprising one or more instructions that, when executed by one or more processors of a device, cause the device to perform the method of one or more of Aspects 41 through 80.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by an apparatus of a user equipment (UE), comprising:
    receiving, from a network entity, a physical downlink control channel (PDCCH) indicating a configuration for one or more of: demodulation reference signal (DMRS) bundling that is to be used for channel estimation by the network entity for a first group of physical uplink control channels (PUCCHs), or frequency hopping for a second group of PUCCHs, wherein a PUCCH resource indicator (PRI) bitfield of downlink control information (DCI) included in the PDCCH or an index of a first control channel element (CCE) of the PDCCH indicates that the DMRS bundling that is to be used for the channel estimation by the network entity; and
    transmitting, to the network entity, one or more PUCCHs based at least in part on the configuration.

2. The method of claim 1, wherein the configuration is for the DMRS bundling, and wherein the UE transmits the one or more PUCCHs based at least in part on the configuration by maintaining an uplink continuity among DMRSs of the one or more PUCCHs.

3. The method of claim 2, wherein the uplink continuity among the DMRSs is maintained based at least in part on one or more of:
    maintaining a phase continuity among the DMRSs,
    maintaining an amplitude continuity among the DMRSs,
    avoiding any change in an uplink spatial filtering,
    avoiding any change in an uplink precoding, or
    avoiding any change in a timing advance.

4. The method of claim 1, wherein DCI is for scheduling resources for a physical downlink shared channel (PDSCH), and wherein the PRI bitfield of the DCI indicates that the DMRS bundling is to be used for the channel estimation by the network entity for the first group of PUCCHs.

5. The method of claim 4, wherein the PM bitfield indicates a PUCCH resource, and wherein DMRS bundling is preconfigured for the PUCCH resource.

6. The method of claim 1, wherein the DCI is for scheduling resources for a physical downlink shared channel (PDSCH), and wherein the index of the first CCE of the PDCCH and the bitfield of the DCI indicates that the DMRS bundling is to be used for the channel estimation by the network entity for the one or more PUCCHs.

7. The method of claim 6, wherein the index of the first CCE of the PDCCH and the PRI bitfield indicate a PUCCH resource, and wherein DMRS bundling is preconfigured for the PUCCH resource.

8. The method of claim 1, wherein an aggregation level of the PDCCH indicates the configuration for the one or more of the DMRS bundling or the frequency hopping.

9. The method of claim 1, wherein a cell radio network temporary identifier (C-RNTI) that is used to mask a cyclic redundancy check (CRC) of the PDCCH indicates the configuration for the one or more of the DMRS bundling or the frequency hopping.

10. The method of claim 9, wherein the C-RNTI is shifted by a fixed number to indicate an alternative subset of PUCCH resources.

11. The method of claim 1, wherein one or more of a PDCCH DMRS sequence, a port of the UE, or an orthogonal cover code indicates the configuration of the one or more of the DMRS bundling or the frequency hopping.

12. The method of claim 1, wherein a virtual cell identifier indicates the configuration of the frequency hopping.

13. The method of claim 1, wherein the DCI is for scheduling resources for a physical downlink shared channel (PDSCH), and wherein a time domain resource assignment (TDRA) bitfield of the DCI indicates the configuration for the one or more of the DMRS bundling or the frequency hopping.

14. The method of claim 13, wherein a column of a TDRA table indicates the frequency hopping.

15. The method of claim 13, wherein a size and length indicator value (SLIV) or a function of the SLIV indicates the frequency hopping.

16. The method of claim 15, wherein the frequency hopping is indicated based at least in part on whether the SLIV is an odd value or an even value.

17. The method of claim 1, wherein the PDC the DCI is for scheduling resources for a physical downlink shared channel (PDSCH), and wherein a frequency domain resource assignment (FDRA) bitfield of the DCI indicates the configuration of the one or more of the DMRS bundling or the frequency hopping.

18. The method of claim 17, wherein the FDRA bitfield of the DCI indicates the configuration of the one or more of the DMRS bundling or the frequency hopping based at least in part on whether a first resource block (RB) index comprises an even value or an odd value.

19. The method of claim 1, wherein the PDCCH indicates a PUCCH resource of one or more PUCCH resources, and wherein the PUCCH resource is preconfigured for DMRS bundling.

20. The method of claim 1, wherein DMRS bundling is configured per PUCCH resource.

21. The method of claim 1, wherein the PDCCH indicates an option, of a plurality of options, configured for a PUCCH resource of the one or more PUCCH resources, and wherein the option indicates that the DMRS bundling is to be used for the channel estimation by the network entity for the one or more PUCCH resources.

22. The method of claim 1, wherein the PDCCH indicates a first configuration when only the DMRS bundling is to be used for the channel estimation by the network entity for the one or more PUCCHs, and wherein the PDCCH indicates a second configuration when only the frequency hopping is to be applied to transmitting the one or more PUCCHs.

23. The method of claim 1, wherein the the DCI schedules a physical downlink shared channel (PDSCH), and wherein the DCI and one or more parameters of the PDCCH indicate the frequency hopping for the one or more PUCCHs.

24. An apparatus of a user equipment (UE) for wireless communication, comprising:
 a memory; and
 one or more processors, coupled to the memory, configured to:
  receive, from a network entity, a physical downlink control channel (PDCCH) indicating a configuration for one or more of: demodulation reference signal (DMRS) bundling that is to be used for channel estimation by the network entity for a first group of physical uplink control channels (PUCCHs), or frequency hopping for a second group of PUCCHs, wherein a PUCCH resource indicator (PRI) bitfield of downlink control information (DCI) included in the PDCCH or an index of a first control channel element (CCE) of the PDCCH indicates that the DMRS bundling that is to be used for the channel estimation by the network entity; and
  transmit, to the network entity, one or more PUCCHs based at least in part on the configuration.

25. The apparatus of claim 24, wherein the configuration is for the DMRS bundling, and wherein the one or more processors, to transmit the one or more PUCCHs, are configured to transmit the one or more PUCCHs based at least in part on the configuration by maintaining an uplink continuity among DMRSs of the one or more PUCCHs.

26. The apparatus of claim 24, wherein an aggregation level of the PDCCH indicates the configuration for the one or more of the DMRS bundling or the frequency hopping.

27. A non-transitory computer-readable medium storing a set of instructions for wireless communication, the set of instructions comprising:
 one or more instructions that, when executed by one or more processors of an apparatus of a user equipment (UE), cause the apparatus to:
  receive, from a network entity, a physical downlink control channel (PDCCH) indicating a configuration for one or more of: demodulation reference signal (DMRS) bundling that is to be used for channel estimation by the network entity for a first group of physical uplink control channels (PUCCHs), or frequency hopping for a second group of PUCCHs, wherein a PUCCH resource indicator (PM) bitfield of downlink control information (DCI) included in the PDCCH or an index of a first control channel element (CCE) of the PDCCH indicates that the DMRS bundling that is to be used for the channel estimation by the network entity; and
  transmit, to the network entity, one or more PUCCHs based at least in part on the configuration.

28. The non-transitory computer-readable medium of claim 27, wherein the configuration is for the DMRS bundling, and wherein the one or more instructions, that cause the apparatus to transmit the one or more PUCCHs, further cause the apparatus to transmit the one or more PUCCHs based at least in part on the configuration by maintaining an uplink continuity among DMRSs of the one or more PUCCHs.

29. An apparatus of a user equipment (UE) for wireless communication, comprising:
 means for receiving, from a network entity, a physical downlink control channel (PDCCH) indicating a configuration for one or more of: demodulation reference signal (DMRS) bundling that is to be used for channel estimation by the network entity for a first group of physical uplink control channels (PUCCHs), or frequency hopping for a second group of PUCCHs, wherein a PUCCH resource indicator (PM) bitfield of downlink control information (DCI) included in the PDCCH or an index of a first control channel element (CCE) of the PDCCH indicates that the DMRS bundling that is to be used for the channel estimation by the network entity; and means for transmitting, to the network entity, one or more PUCCHs based at least in part on the configuration.

30. The apparatus of claim 29, wherein the configuration is for the DMRS bundling, and wherein the means for transmitting the one or more PUCCHs comprise means for transmitting the one or more PUCCHs based at least in part on the configuration by maintaining an uplink continuity among DMRSs of the one or more PUCCHs.

\* \* \* \* \*